(12) United States Patent
Yoshikawa et al.

(10) Patent No.: US 10,677,313 B2
(45) Date of Patent: Jun. 9, 2020

(54) DAMPER DEVICE

(71) Applicants: AISIN AW INDUSTRIES CO., LTD, Echizen-shi, Fukui (JP); AISIN AW CO., LTD., Anjo-shi, Aichi (JP)

(72) Inventors: Takuya Yoshikawa, Echizen (JP); Aki Ogawa, Echizen (JP); Akiyoshi Kato, Echizen (JP); Ryosuke Otsuka, Echizen (JP); Yoshihiro Inoue, Echizen (JP); Yoshihiro Takikawa, Anjo (JP); Hiroki Nagai, Anjo (JP); Masaki Wajima, Anjo (JP); Takao Sakamoto, Anjo (JP); Kazuhiro Itou, Anjo (JP)

(73) Assignees: AISIN AW INDUSTRIES CO., LTD., Echizen-Shi (JP); AISIN AW CO., LTD., Anjo (JP)

( * ) Notice: Subject to any disclaimer, the term of this patent is extended or adjusted under 35 U.S.C. 154(b) by 280 days.

(21) Appl. No.: 15/738,005

(22) PCT Filed: Jun. 27, 2016

(86) PCT No.: PCT/JP2016/069024
§ 371 (c)(1),
(2) Date: Dec. 19, 2017

(87) PCT Pub. No.: WO2016/208767
PCT Pub. Date: Dec. 29, 2016

(65) Prior Publication Data
US 2018/0245663 A1 Aug. 30, 2018

(30) Foreign Application Priority Data
Jun. 26, 2015 (JP) .................................. 2015-129111

(51) Int. Cl.
*F16F 15/134* (2006.01)
*F16F 15/12* (2006.01)
(Continued)

(52) U.S. Cl.
CPC .......... *F16F 15/13469* (2013.01); *F16D 3/12* (2013.01); *F16F 15/1206* (2013.01);
(Continued)

(58) Field of Classification Search
CPC .. F16F 15/13469; F16F 15/31; F16F 15/1206; F16F 15/134; F16F 15/12373;
(Continued)

(56) References Cited

U.S. PATENT DOCUMENTS 6,126,568 A 10/2000 Sudau
8,845,479 B2 * 9/2014 Hwang ............... F16F 15/1478
(Continued)

FOREIGN PATENT DOCUMENTS

DE 19846445 A1 3/2000
JP 3299510 B2 7/2002
(Continued)

OTHER PUBLICATIONS

Jul. 26, 2016 International Search Report issued in International Patent Application No. PCT/JP2016/069024.

*Primary Examiner* — Greg Binda
(74) *Attorney, Agent, or Firm* — Oliff PLC

(57) ABSTRACT

A rotary inertia mass damper of a damper device is configured to include a planetary gear that includes a driven member with outer teeth, first and second input plate member as a carrier which rotatably supports a plurality of pinion gears, and a ring gear that meshes with the plurality of pinion gears and works as the mass body. The outer teeth of the driven member are arranged to be disposed outside first and second springs in a radial direction of the damper device. The driven member, the plurality of pinion gears and the ring gear are arranged to at least partially overlap with the first
(Continued)

and second springs as viewed in the radial direction. A motion of the ring gear in the axial direction is restricted by the plurality of pinion gears.

28 Claims, 11 Drawing Sheets

(51) Int. Cl.
*F16F 15/31* (2006.01)
*F16D 3/12* (2006.01)
*F16H 1/28* (2006.01)
*F16H 45/02* (2006.01)
*F16F 15/123* (2006.01)

(52) U.S. Cl.
CPC ............ *F16F 15/134* (2013.01); *F16F 15/31* (2013.01); *F16H 1/28* (2013.01); *F16F 15/12373* (2013.01); *F16H 45/02* (2013.01); *F16H 2045/0226* (2013.01); *F16H 2045/0268* (2013.01); *Y10T 74/2128* (2015.01)

(58) Field of Classification Search
CPC ............... F16H 1/28; F16H 2045/0268; F16H 2045/0226; F16H 45/02; F16D 3/12; Y10T 74/2128
USPC ................................. 464/68.2; 475/346, 347
See application file for complete search history.

(56) References Cited

U.S. PATENT DOCUMENTS

| | | | |
|---|---|---|---|
| 10,487,909 B2* | 11/2019 | Yoshikawa | ............. F16H 41/24 |
| 2011/0098120 A1 | 4/2011 | Nakagaito et al. | |
| 2017/0276210 A1* | 9/2017 | Nakamura | .......... F16F 15/1202 |

FOREIGN PATENT DOCUMENTS

| | | |
|---|---|---|
| JP | 2008-164013 A | 7/2008 |
| JP | 2010-101380 A | 5/2010 |
| JP | 2011-094656 A | 5/2011 |

* cited by examiner

DAMPER DEVICE

This is a national phase application of PCT/JP2016/069024 filed Jun. 27, 2016, claiming priority to Japanese Patent Application No. JP2015-129111 filed Jun. 26, 2015, the contents of which are incorporated herein by reference.

TECHNICAL FIELD

The present disclosure relates to a damper device including a plurality of rotational elements which includes an input element and an output element, an elastic body configured to transmit a torque between the input element and the output element, and a rotary inertia mass damper with a mass body rotating in accordance with relative rotation between a plurality of rotational elements.

BACKGROUND

A conventionally known torque converter includes a lockup clutch, a torsional vibration damper, and a rotary inertia mass damper (power transmission mechanism) with a planetary gear (as shown in, for example, Patent Literature 1). In the torsional vibration damper of the torque converter has two cover plates (input element) are respectively coupled with a lockup piston by means of a plurality of bearing journals, a sun gear disposed between the two cover plates in an axial direction thereof such as to work as a driven-side transmission element (output element), and springs (elastic bodies) which transmit a torque between the cover plates and the sun gear. In addition to the sun gear, the rotary inertia mass damper further has a plurality of pinion gears (planet gears) rotatably supported by the cover plates as carrier via the bearing journals such as to mesh with the sun gear, and a ring gear that meshes with the plurality of pinion gears. In the above conventional torque converter, when the lockup clutch is engaged and the cover plates of the torsional vibration damper is rotated (twisted) relative to the sun gear, the springs are deflected and the ring gear as the mass body is rotated in accordance with relative rotation of the cover plates and the sun gear. This configuration causes an inertia torque according to a difference in angular acceleration between the cover plates and the sun gear to be applied to the sun gear as the output element of the torsional vibration damper from the ring gear as the mass body via pinion gears and improves the vibration damping performance of the torsional vibration damper.

CITATION LIST

Patent Literature

PTL1: Japanese Patent No. 3299510

SUMMARY

In the conventional torsional vibration damper, the springs that transmit the torque are pressed against the cover plates by a centrifugal force, so that a frictional force occurs between the springs and the cover plates. Therefore, a difference or a hysteresis occurs between a torque transmitted to the sun gear (output element) from the springs when an input torque to the cover plates (input element) increases and a torque transmitted to the sun gear from the springs when the input torque to the cover plates decreases. The hysteresis of the torsional vibration damper causes a phase shift of a vibration transmitted to the sun gear from the springs. Further, in the rotary inertia mass damper of the above torque converter, the ring gear of the mass body is supported by the two cover plates or the carrier from both sides thereof, so that a difference in rotational speed (relative speed) occurs between the ring gear and the cover plates. The difference in the rotational speed between the mass body and a support member of the mass body causes the difference or a hysteresis occurs between a torque transmitted to the sun gear (output element) from the rotary inertia mass damper when a relative displacement between the cover plates (input element) and the sun gear (output element) increases and a torque transmitted to the sun gear from the rotary inertia mass damper when the relative displacement between the cover plates and the sun gear decreases. The hysteresis of the rotary inertia mass damper also causes the phase shift of a vibration transmitted to the sun gear from the rotary inertia mass damper. Accordingly, it is necessary to take into account the hysteresis of both the torsional vibration damper and the rotary inertia damper such as to improve the vibration damping performance in the above conventional torque converter. However, the Patent Literature 1 does not take into account not only the hysteresis of the torsional vibration damper but also the hysteresis of the rotary inertia mass damper. Therefore, it is not easy to improve the vibration damping performance in the torque converter of the Patent Literature 1.

A subject matter of the disclosure is to improve vibration damping performance of the damper device with a rotary inertia mass damper.

The disclosure is directed to a damper device. The damper device is configured to include a plurality of rotational elements including an input element to which a torque from an engine is transmitted and an output element, an elastic body configured to transmit a torque between the input element and the output element, and a rotary inertia mass damper with a mass body rotating in accordance with relative rotation between a first rotational element which is one of the plurality of rotational elements and a second rotational element different from the first rotational element. The rotary inertia mass damper is configured to include a planetary gear that includes a sun gear arranged to rotate integrally with the first element, a carrier that rotatably supports a plurality of pinion gears and is arranged to rotate integrally with the second element, and a ring gear that meshes with the plurality of pinion gears and works as the mass body. Outer teeth of the sun gear are arranged to be disposed outside the elastic body in a radial direction of the damper device. The sun gear, the plurality of pinion gears and the ring gear are arranged to at least partially overlap with the elastic body in an axial direction of the damper device as viewed in the radial direction. A motion of the ring gear in the axial direction is restricted by the plurality of pinion gears.

The damper device of this aspect enables an antiresonance point where a vibration amplitude of the output element theoretically becomes equal to zero to be set therein. Further, the outer teeth of the sun gear of the rotary inertia mass damper are arranged to be located outside the elastic body in the radial direction of the damper device, the elastic body transmitting a torque between the input element and the output element. Accordingly, a centrifugal force applied to the elastic body is reduced, thereby decreasing a hysteresis of the elastic body. Furthermore, in the damper device, the motion of the ring gear or the mass body of the rotary inertia mass damper in the axial direction is restricted by the plurality of pinion gears. This configuration enables a relative speed between the ring gear and the pinion gears that meshes with each other to be smaller than a relative speed between the ring gear and the carrier. Accordingly, a hysteresis of the rotary inertia mass damper is satisfactorily decreased, compared with restricting the motion of the ring gear in the axial direction by a member that works as the carrier of the planetary gear, for example. As a result, the damper device satisfactorily decreases both the hysteresis of the elastic body and the hysteresis of the rotary inertia mass damper, thereby decreasing the vibration amplitude of the output element about the antiresonance point. Therefore, the vibration damping performance of the damper device is effectively improved by making a frequency of the antiresonance point equal to (closer to) a frequency of a vibration (resonance) to be damped by the damper device.

DESCRIPTION OF EMBODIMENTS

The following describes some embodiments of the disclosure with reference to drawings.

Figure 1:
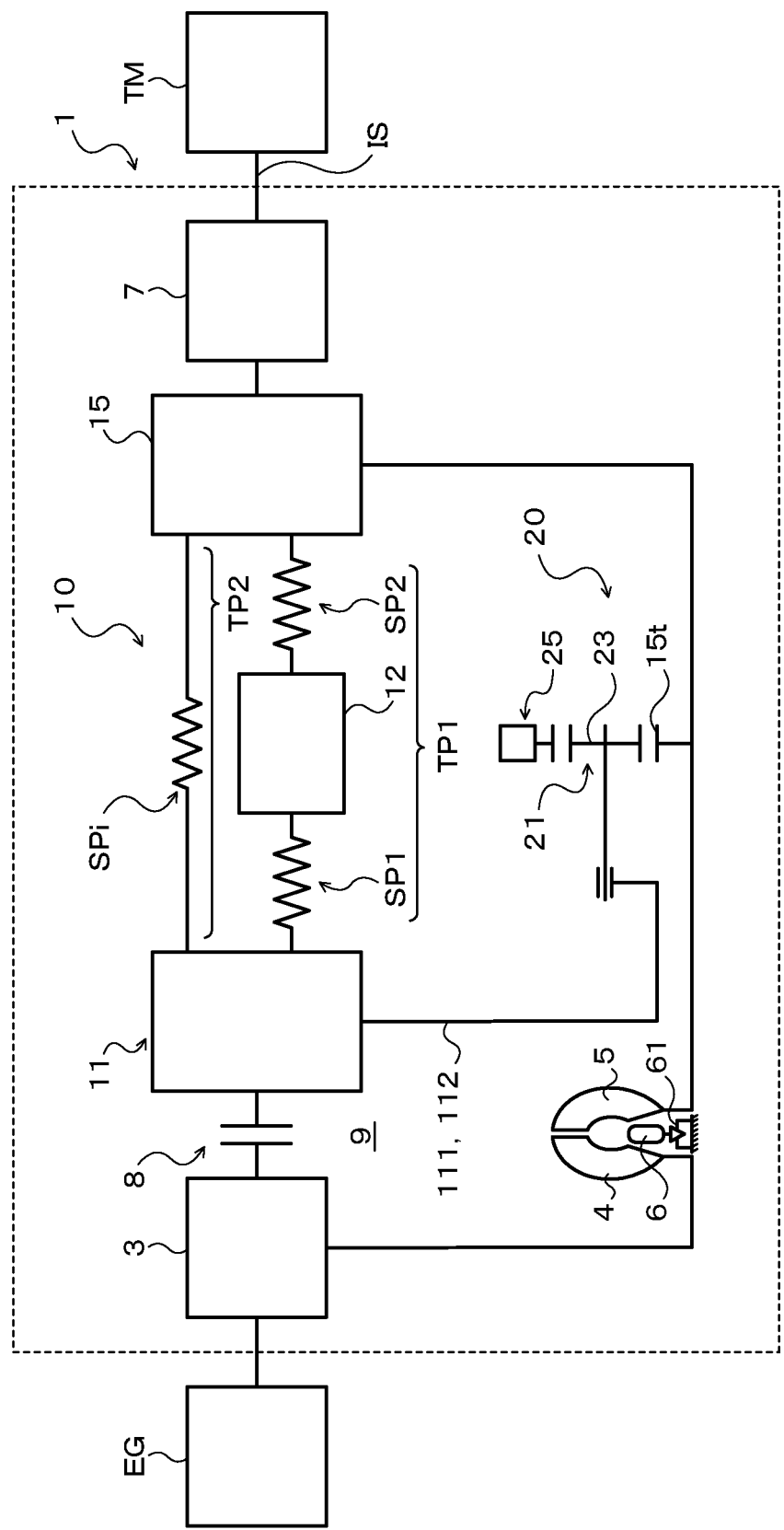
FIG. 1 is a schematic configuration diagram illustrating a starting device including a damper device according to the disclosure.
Figure 2:
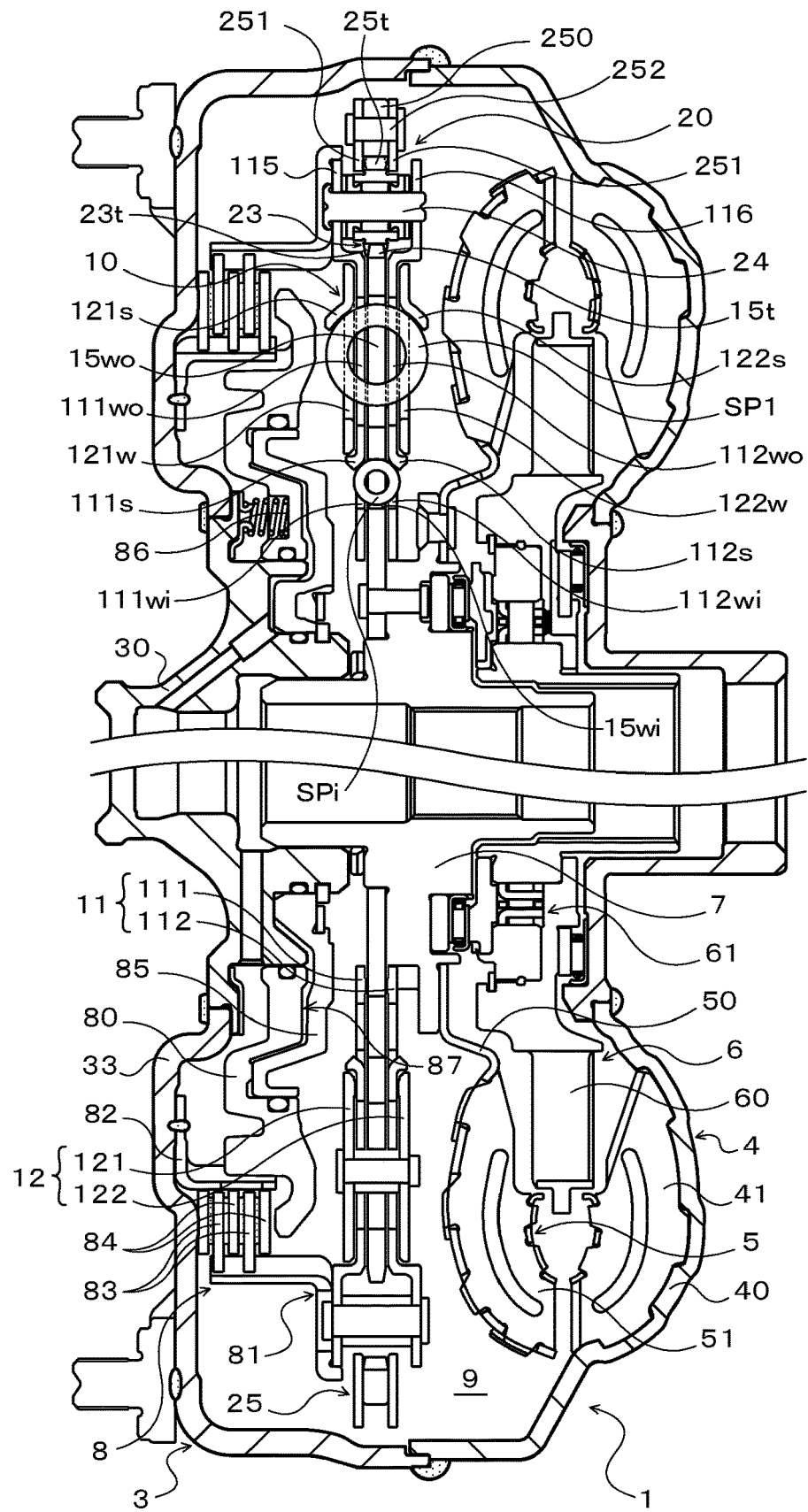
FIG. 2 is a sectional view illustrating the starting device of FIG. 1.

FIG. 1 is a schematic configuration diagram illustrating a starting device 1 including a damper device 10 according to the disclosure. FIG. 2 is a sectional view illustrating the starting device 1. The starting device 1 illustrated in these drawings is mounted on a vehicle equipped with an engine (internal combustion engine) EG as a driving source and may include, in addition to the damper device 10, for example, a front cover 3 serving as an input member connected with a crankshaft of the engine EG and configured to receive a torque transmitted from the engine EG, a pump impeller (input-side fluid transmission element) 4 fixed to the front cover 3, a turbine runner (output-side fluid transmission element) 5 arranged to be rotatable coaxially with the pump impeller 4, a damper hub 7 serving as an output member connected with the damper device 10 and fixed to an input shaft IS of a transmission TM that is either an automatic transmission (AT) or a continuously variable transmission (CVT), and a lockup clutch 8.

In the description below, a term "axial direction" basically means an extending direction of a central axis (axial center) of the starting device 1 or the damper device 10, unless otherwise specified. A term "radial direction" basically means a radial direction of the starting device 1, the damper device 10 or a rotational element of the damper device 10 and so on, i.e., an extending direction of a straight line extended in a direction perpendicular to the central axis (radial direction) from the central axis of the starting device 1 or the damper device 10, unless otherwise specified. Additionally, a term "circumferential direction" basically means a circumferential direction of the starting device 1, the damper device 10 or a rotational element of the damper device 10 and so on, i.e., a direction along a rotation direction of the rotational element, unless otherwise specified.

As shown in FIG. 2, the pump impeller 4 includes a pump shell 40 closely fixed to the front cover 3 to define a fluid chamber 9 in which hydraulic oil flows and a plurality of pump blades 41 provided on an inner surface of the pump shell 40. As shown in FIG. 2, the turbine runner 5 includes a turbine shell 50 and a plurality of turbine blades 51 provided on an inner surface of the turbine shell 50. An inner circumferential portion of the turbine shell 50 is fixed to the damper hub 7 by means of a plurality of rivets. The pump impeller 4 and the turbine runner 5 are opposed to each other, and a stator 6 is disposed coaxially between the pump impeller 4 and the turbine runner 5 to straighten the flow of hydraulic oil (hydraulic fluid) from the turbine runner 5 to the pump impeller 4. The stator 6 includes a plurality of stator blades 60. The rotation direction of the stator 6 is set to only one direction by a one-way clutch 61. The pump impeller 4, the turbine runner 5 and the stator 6 form a torus (annular flow path) to circulate the hydraulic oil and work as a torque converter (fluid transmission device) with the torque amplification function. In the starting device 1, however, the stator 6 and the one-way clutch 61 may be omitted, and the pump impeller 4 and the turbine runner 5 may work as fluid coupling.

The lockup clutch 8 is a hydraulic multi-plate clutch which executes and releases a lockup in which the front cover 3 and the damper hub 7 are coupled to each other via the damper device 10. The lockup clutch 8 includes a lockup piston 80 slidably supported in the axial direction by a center piece 30 which is fixed to the front cover 3, a clutch drum 81, an annular clutch hub 82 fixed to an inner surface of a side wall portion 33 of the front cover 3 to oppose to the lockup piston 80, a plurality of first friction engagement plates (friction plates with a friction material on both surfaces) 83 engaged to splines formed on an inner periphery of the clutch drum 81, and a plurality of second friction engagement plates 84 (separator plates) engaged to splines formed on an outer periphery of the clutch hub 82.

Further, the lockup clutch 8 includes an annular flange member (oil chamber defining member) 85 attached to the center piece 30 of the front cover 3 to be disposed on the side opposite to the front cover 3 with respect to the lockup piston 80, that is, disposed on the side of the turbine runner 5 and the damper device 10 with respect to the lockup piston 80, and a plurality of return springs 86 disposed between the front cover 3 and the lockup piston 80. As illustrated in the drawing, the lockup piston 80 and the flange member 85 define an engagement oil chamber 87. Hydraulic oil (engagement hydraulic pressure) is supplied to the engagement oil chamber 87 from a hydraulic control device (not illustrated). Increasing the engagement hydraulic pressure for the engagement oil chamber 87 moves the lockup piston 80 in the axial direction such that the first and the second friction engagement plates 83 and 84 are pressed toward the front cover 3, which brings the lockup clutch 8 into engagement (complete engagement or slip engagement). A hydraulic single-plate clutch that includes a lockup piston to which a friction material is affixed may be adopted as the lockup clutch 8.

As shown in FIGS. 1 and 2, the damper device 10 includes a drive member (input element) 11, an intermediate member (intermediate element) 12 and a driven member (output element) 15, as rotational elements. The damper device 10 also includes a plurality of (for example, three in this embodiment) first springs (first elastic bodies) SP1 arranged to transmit the toque between the drive member 11 and the intermediate member 12, a plurality of (for example, three in this embodiment) second springs (second elastic bodies) SP2 arranged to respectively work in series with the corresponding first springs SP1 and to transmit the torque between the intermediate member 12 and the driven member 15, and a plurality of (for example, three in this embodiment) inner springs SPi arranged to transmit the torque between the drive member 11 and the driven member 15, as torque transmission elements (torque transmission elastic bodies).

As shown in FIG. 1, the damper device 10 has a first torque transmission path TP1 and a second torque transmission path TP2 that are provided parallel to each other between the drive member 11 and the driven member 15. The first torque transmission path TP1 is configured by the plurality of first springs SP1, the intermediate member 12 and the plurality of second springs SP2 such as to transmit the torque between the drive member 11 and the driven member 15 via these elements. According to this embodiment, coil springs having an identical specification (spring constant) are employed for the first and the second springs SP1 and SP2 of the first torque transmission path TP1.

The second torque transmission path TP2 is configured by the plurality of inner springs SPi such as to transmit the torque between the drive member 11 and the driven member 15 via the plurality of inner springs SPi that work parallel to one another. According to this embodiment, the plurality of inner springs SPi of the second torque transmission path TP2 are configured to work in parallel to the first and the second springs SP1 and SP2 of the first torque transmission path TP1, after an input torque into the drive member 11 reaches a predetermined torque (first threshold value) T1 that is smaller than a torque T2 (second threshold value) corresponding to a maximum torsion angle $\theta$max of the damper device 10 and a torsion angle of the drive member 11 relative to the driven member 15 becomes equal to or larger than a predetermined angle $\theta$ref. The damper device 10 accordingly has two-step (two-stage) damping characteristics.

According to this embodiment, a linear coil spring made of a metal material that is spirally wound to have an axial center extended linearly at no load is employed for the first and the second springs SP1 and SP2 and the inner springs SPi. Compared with employing an arc coil spring, this more appropriately expands and contracts the first and the second springs SP1 and SP2 and the inner springs SPi along their axial centers and reduces a difference between a torque transmitted to the driven member 15 from the second springs SP2 and the like when a relative displacement between the drive member 11 and the driven member 15 increases and a torque transmitted to the driven member 15 from the second springs SP2 and the like when the relative displacement between the drive member 11 and the driven member 15 decreases, that is a hysteresis. The arc coil spring may, however, be employed for at least any of the first and the second springs SP1 and SP2 and the inner springs SPi.

As shown in FIG. 2, the drive member 11 of the damper device 10 includes an annular first input plate member 111 that is coupled with the clutch drum 81 of the lockup clutch 8, and an annular second input plate member 112 that is coupled with the first input plate member 111 by means of a plurality of rivets such as to be opposed with the first input plate member 111. Accordingly, the drive member 11, or the first and the second input plate members 111 and 112 rotate integrally with the clutch drum 81. Further, the front cover 3 (engine EG) is coupled with the drive member 11 of the damper device 10 by engagement of the lockup clutch 8.

Figure 3:
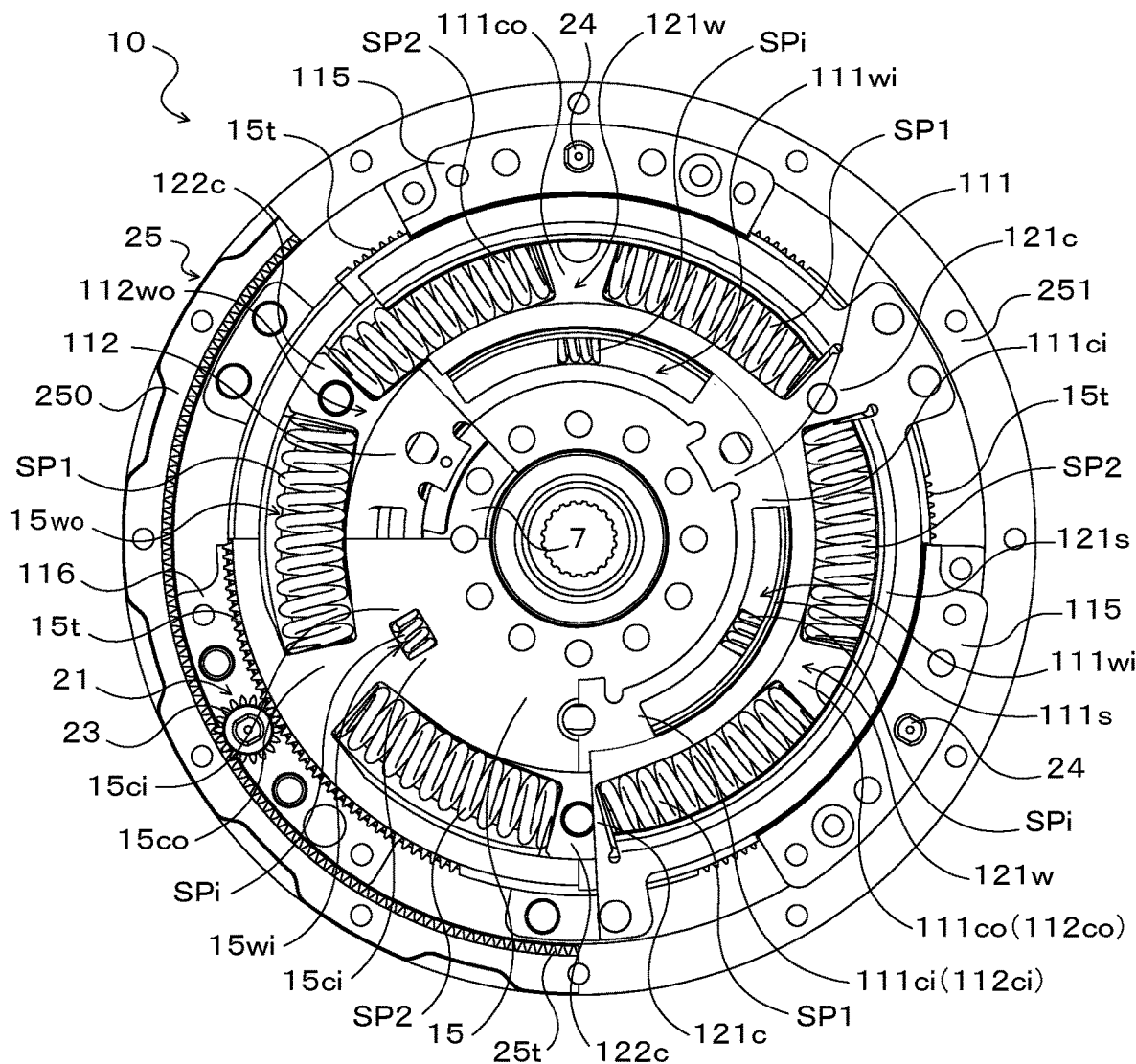
FIG. 3 is a front view illustrating the damper device according to the disclosure.

As shown in FIGS. 2 and 3, the first input plate member 111 is configured to include a plurality of (for example, three in this embodiment) arc-shaped outer spring-accommodating windows 111wo arranged at intervals (at equal intervals) in the circumferential direction, a plurality of (for example, three in this embodiment) arc-shaped inner spring-accommodating windows 111wi arranged on an inner side in the radial direction of each outer spring-accommodating window 111wo at intervals (at equal intervals) in the circumferential direction, a plurality of (for example, three in this embodiment) spring support portions 111s respectively extending along an outer circumferential edge of each inner spring-accommodating window 111wi, a plurality of (for example, three in this embodiment) outer spring contact portions 111co, and a plurality of (for example, six in this embodiment) inner spring contact portions 111ci. The inner spring-accommodating windows 111wi respectively have a circumferential length longer than a natural length of the inner spring SPi (see FIG. 3). One outer spring contact portion 111co is disposed between the outer spring-accommodating windows 111wo arranged adjacent to each other in the circumferential direction. One inner spring contact portion 111ci is disposed on each side in the circumferential direction of each inner spring-accommodating window 111wi.

The second input plate member 112 is configured to include a plurality of (for example, three in this embodiment) arc-shaped outer spring-accommodating windows 112wo arranged at intervals (at equal intervals) in the circumferential direction, a plurality of (for example, three in this embodiment) arc-shaped inner spring-accommodating windows 112wi arranged on an inner side in the radial direction of each outer spring-accommodating window 112wo at intervals (at equal intervals) in the circumferential direction, a plurality of (for example, three in this embodiment) spring support portions 112s respectively extending along an outer circumferential edge of each inner spring-accommodating window 112wi, a plurality of (for example, three in this embodiment) outer spring contact portions 112co, and a plurality of (for example, six in this embodiment) inner spring contact portions 112ci. The inner spring-accommodating windows 112wi respectively have a circumferential length longer than the natural length of the inner spring SPi (see FIG. 3). One outer spring contact portion 112co is disposed between the outer spring-accommodating windows 112wo arranged adjacent to each other in the circumferential direction. One inner spring contact portion 112*ci* is disposed on each side in the circumferential direction of each inner spring-accommodating window 112*wi*. In this embodiment, the first and the second input plate members 111 and 112 have an identical shape such as to reduce the number of kinds of parts.

The intermediate member 12 includes a first intermediate plate member 121 that is disposed on the front cover 3-side of the first input plate member 111 of the drive member 11, and a second intermediate plate member 122 that is disposed on the turbine runner 5-side of the second input plate member 112 of the drive member 11 and coupled with the first intermediate plate member 121 by means of a plurality of rivets. As shown in FIG. 2, the first and the second input plate members 111 and 112 are disposed between the first intermediate plate member 121 and the second intermediate plate member 122 in the axial direction of the damper device 10.

As shown in FIGS. 2 and 3, the first intermediate plate member 121 is configured to include a plurality of (for example, three in this embodiment) arc-shaped spring-accommodating windows 121*w* arranged at intervals (at equal intervals) in the circumferential direction, a plurality of (for example, three in this embodiment) spring support portions 121*s* respectively extending along an outer circumferential edge of the corresponding spring-accommodating window 121*w*, and a plurality of (for example, three in this embodiment) spring contact portions 121*c*. One spring contact portion 121*c* is disposed between the spring-accommodating windows 121*w* arranged adjacent to each other in the circumferential direction. The second intermediate plate member 122 is configured to include a plurality of (for example, three in this embodiment) arc-shaped spring-accommodating windows 122*w* arranged at intervals (at equal intervals) in the circumferential direction, a plurality of (for example, three in this embodiment) spring support portions 122*s* respectively extending along an outer circumferential edge of the corresponding spring-accommodating window 122*w*, and a plurality of (for example, three in this embodiment) spring contact portions 122*c*. One spring contact portion 122*c* is disposed between the spring-accommodating windows 122*w* arranged adjacent to each other in the circumferential direction. In this embodiment, the first and the second intermediate plate members 121 and 122 have an identical shape such as to reduce the number of kinds of parts.

The driven member 15 is a plate-like annular member that is disposed between the first and the second input plate members 111 and 112 in the axial direction and fixed to the damper hub 7 by means of a plurality of rivets. As shown in FIGS. 2 and 3, the driven member 15 is configured to include a plurality of (for example, three in this embodiment) arc-shaped outer spring-accommodating windows 15*wo* arranged at intervals (at equal intervals) in the circumferential direction, a plurality of (for example, three in this embodiment) arc-shaped inner spring-accommodating windows 15*wi* arranged on an inner side in the radial direction of each outer spring-accommodating window 15*wo* at intervals (at equal intervals) in the circumferential direction, a plurality of (for example, three in this embodiment) outer spring contact portions 15*co*, and a plurality of (for example, six in this embodiment) inner spring contact portions 15*ci*. One outer spring contact portion 15*co* is disposed between the outer spring-accommodating windows 15*wo* arranged adjacent to each other in the circumferential direction. The inner spring-accommodating windows 15*wi* respectively have a circumferential length longer than the natural length of the inner spring SPi. One inner spring contact portion 15*ci* is disposed on each side in the circumferential direction of each inner spring-accommodating window 15*wi*.

One first spring SP1 and one second spring SP2 are disposed in the outer spring-accommodating windows 111*wo* and 112*wo* of the first and the second input plate members 111 and 112 and outer spring-accommodating windows 15*wo* of the driven member 15, such that the first and the second springs SP1 and SP2 form a pair (to act in series). In the mounting state of the damper device 10, the outer spring contact portions 111*co* and 112*co* of the first and the second input plate members 111 and 112 and the outer spring contact portions 15*co* of the driven member 15 are respectively disposed between the first and the second springs SP1 and SP2 that are disposed in the different outer spring-accommodating windows 15*wo*, 111*wo* and 112*wo* not to form a pair (not to act in series), and come into contact with ends of the first and the second springs SP1 and SP2.

The spring contact portions 121*c* and 122*c* of the first and the second intermediate plate members 121 and 122 are respectively disposed between the common outer spring-accommodating windows 15*wo*, 111*wo* and 112*wo* to form a pair, and come into contact with ends of the first and the second springs SP1 and SP2. The first and the second springs SP1 and SP2 disposed in the different outer spring-accommodating windows 15*wo*, 111*wo* and 112*wo* not to form a pair (not to act in series) are disposed in the spring-accommodating windows 121*w* and 122*w* of the first and second intermediate plate members 121 and 122. The first and the second springs SP1 and SP2 that do not form a pair (not to act in series) are supported (guided) from the outer side in the radial direction by the spring support portion 121*s* of the first intermediate plate member 121 on the front cover 3-side and the spring support portion 122*s* of the second intermediate plate member 122 on the turbine runner 5-side.

As shown in FIG. 3, the first and the second springs SP1 and SP2 are thus alternately arranged in the circumferential direction of the damper device 10. One end of each first spring SP1 comes into contact with the corresponding outer spring contact portions 111*co* and 112*co* of the drive member 11, and the other end of each first spring SP1 comes into contact with the corresponding spring contact portions 121*c* and 122*c* of the intermediate member 12. One end of each second spring SP2 comes into contact with the corresponding spring contact portions 121*c* and 122*c* of the intermediate member 12, and the other end of each second spring SP2 comes into contact with the corresponding outer spring contact portion 15*co* of the driven member 15.

As a result, the first and the second springs SP1 and SP2 forming a pair are connected with each other in series via the spring contact portions 121*c* and 122*c* of the intermediate member 12 between the drive member 11 and the driven member 15. Accordingly, the damper device 10 further reduces the rigidity of the elastic bodies configured to transmit the torque between the drive member 11 and the driven member 15 or more specifically a combined spring constant of the first and the second springs SP1 and SP2. In this embodiment, as shown in FIG. 3, the plurality of first springs SP1 and the plurality of second springs SP2 are arranged on an identical circumference, such that the distance between the axial center of the starting device 1 or the damper device 10 and the axial center of each first spring SP1 is equal to the distance between the axial center of the starting device 1 and so on and the axial center of each second spring SP2.

The inner spring SPi is disposed in each of the inner spring-accommodating windows 15*wi* of the driven member 15. In the mounting state of the damper device 10, each of the inner spring contact portions 15ci comes into contact with a corresponding end of the inner spring SPi. In the mounting state of the damper device 10, a side of the each inner spring SPi on the front cover 3-side is located in a circumferential center of the corresponding inner spring-accommodating window 111wi of the first input plate member 111 and supported (guided) from the outer side in the radial direction by the spring support portion 111s of the first input plate member 111. In the mounting state of the damper device 10, a side of the each inner spring SPi on the turbine runner 5-side is located in a circumferential center of the corresponding inner spring-accommodating window 112wi of the second input plate member 112 and supported (guided) from the outer side in the radial direction by the spring support portion 112s of the second input plate member 112.

As shown in FIGS. 2 and 3, each of the inner springs SPi is arranged in an inner circumferential-side region in the fluid chamber 9 such as to be surrounded by the first and the second springs SP1 and SP2. This configuration further shortens the axial length of the damper device 10 and thereby the axial length of the starting device 1. Each of the inner springs SPi comes into contact with one pair of the inner spring contact portions 111ci and 112ci disposed on the respective sides of the inner spring-accommodating windows 111wi and 112wi of the first and second input plate members 111 and 112 when the input torque (drive torque) into the drive member 11 or the torque applied from the axle side to the driven member 15 (driven torque) reaches the above torque T1.

The damper device 10 further includes a stopper (not shown) configured to restrict the relative rotation of the drive member 11 to the driven member 15. In this embodiment, the stopper includes a plurality of stopper portions arranged at intervals in the circumferential direction such as to protrude in the radial direction toward the damper hub 7 from an inner circumferential portion of the second input plate member 112, and a plurality of arc-shaped cut-out portions formed at intervals in the circumferential direction in the damper hub 7 to which the driven member 15 is fixed. In the mounting state of the damper device 10, each of the stopper portions of the second input plate member 112 is disposed in the corresponding cut-out portion of the damper hub 7 such as not to come into contact with wall surfaces of the damper hub 7, the wall surfaces defining both ends of the cut-out portion. When each of the stopper portions of the second input plate member 112 comes into contact with one of the wall surfaces defining both ends of the cut-out portion of the damper hub 7 accompanied with relative rotation of the drive member 11 to the driven member 15, the stopper restricts the relative rotation of the drive member 11 to the driven member 15 and the deflections of all of the t springs SP1, SP2 and SPi.

Additionally, as shown in FIG. 1, the damper device 10 includes a rotary inertia mass damper 20 that is arranged parallel to both the first torque transmission path TP1 that includes the plurality of first springs SP1, the intermediate member 12 and the plurality of second springs SP2 and the second torque transmission path TP2 that includes the plurality of inner springs SPi. In this embodiment, the rotary inertia mass damper 20 is configured to include a single pinion-type planetary gear 21 disposed between the drive member 11 or the input element of the damper device 10 and the driven member 15 or the output element of the damper device 10.

The planetary gear 21 is configured by the driven member 15 that includes outer teeth 15t in an outer circumference thereof such as to work as a sun gear, the first and the second input plate members 111 and 112 that rotatably support a plurality (for example, three in this embodiment) of pinion gears 23 respectively engaging with the outer teeth 15t such as to work as a carrier, and a ring gear 25 that is disposed concentrically with the driven member 15 (outer teeth 15t) or the sun gear and has inner teeth 25t engaging with the each pinion gear 23. Accordingly, in the fluid chamber 9, the driven member 15 or the sun gear, the plurality of pinion gears 23 and the ring gear 25 at least partially overlap with the first and second springs SP1 and SP2 (and inner springs SPi) in the axial direction as viewed in the radial direction of the damper device 10.

As shown in FIGS. 2 and 3, the outer teeth 15t are formed on a plurality of predetermined portions of an outer circumferential surface of the driven member 15 at intervals (at equal intervals) in the circumferential direction. The outer teeth 15t are located radially outside the outer spring-accommodating window 15wo and the inner spring-accommodating window 15wi, that is, the first spring SP1, the second spring SP2 and the inner spring SPi that transmit the torque between the drive member 11 and the driven member 15. The outer teeth 15t may be formed on the entire outer circumference of the driven member 15.

As shown in FIGS. 2 and 3, the first input plate member ill forming the carrier of the planetary gear 21 is configured to include a plurality of (for example, three in this embodiment) pinion gear supporting portions 115 disposed radially outside the outer spring contact portions 111co at intervals (at equal intervals) in the circumferential direction. Similarly, the second input plate member 112 forming the carrier of the planetary gear 21 is configured to include a plurality of (for example, three in this embodiment) pinion gear supporting portions 116 disposed radially outside the outer spring contact portions 112co at intervals (at equal intervals) in the circumferential direction, as shown in FIGS. 2 and 3.

Figure 4:
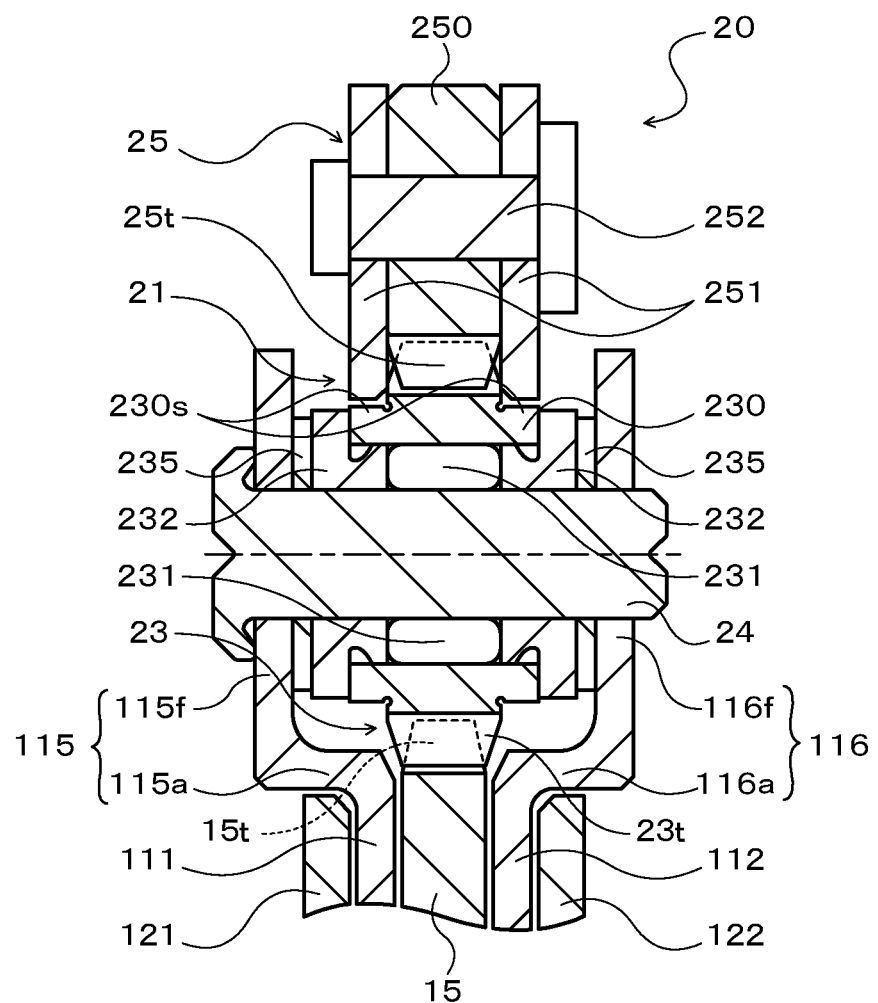
FIG. 4 is an enlarged sectional view illustrating a rotary inertia mass damper of the damper device according to the disclosure.

As shown in FIG. 4, each of the pinion gear supporting portions 115 of the first input plate member 111 is configured to include an arc-shaped axially extending portion 115a configured to axially protrude toward the front cover 3 and an arc-shaped flanged portion 115f radially extended outward from an end of the axially extending portion 115a. Each of the pinion gear supporting portions 116 of the second input plate member 112 is configured to include an arc-shaped axially extending portion 116a configured to axially protrude toward the turbine runner 5 and an arc-shaped flanged portion 116f radially extended outward from an end of the axially extending portion 116a. Each of the pinion gear supporting portions 115 (flanged portion 115f) of the first input plate member 111 is opposed to the corresponding pinion gear supporting portions 116 (flanged portion 116f) of the first input plate member 112 in the axial direction. The flanged portions 115f and 116f forming a pair respectively support an end of a pinion shaft 24 inserted into the pinion gear 23. In this embodiment, the pinion gear supporting portions 115 (flanged portions 115f) are fixed to the clutch drum 81 of the lockup clutch 8 by means of rivets. Further, in this embodiment, the first intermediate plate member 121 of the intermediate member 12 is aligned by an inner circumferential surface of the axially extending portion 115a of the pinion gear supporting portion 115. The second intermediate plate member 122 of the intermediate member 12 is aligned by an inner circumferential surface of the axially extending portion 116a of the pinion gear supporting portion 116.

As shown in FIG. 4, the pinion gears 23 of the planetary gear 21 are configured to include an annular gear body 230 having gear teeth (outer teeth) 23t in an outer circumference thereof, a plurality of needle bearings 231 disposed between an inner circumferential surface of the gear body 230 and an outer circumferential surface of the pinion shaft 24, a pair of spacers 232 engaged to both ends of the gear body 230 such as to restricts an axial motion of the needle bearing 231. As shown in FIG. 4, the gear body 230 of the pinion gear 23 includes annular radially supporting portions 230s that respectively protrude outside an axial end of the gear teeth 23t in an inner side of bottoms of the gear teeth 23t in the radial direction of the pinion gear 23 and have a cylindrical outer circumferential surface. A diameter of an outer circumferential surface of each spacer 232 is identical to or smaller diameter than that of the radially supporting portion 230s.

The plurality of pinion gears 23 are supported at intervals (at equal intervals) in the circumferential direction by the first and the second input plate members 111 and 112 (pinion gear supporting portions 115 and 116) or the carrier. A washer 235 is disposed between a side face of each spacer 232 and the pinion gear supporting portion 115 or 116 (flanged portion 115f or 116f) of the first or the second input plate member 111 or 112. As shown in FIG. 4, an axial gap is defined between both side faces of the gear teeth 23t of the pinion gear 23 and the pinion gear supporting portion 115 or 116 (flanged portion 115f or 116f) of the first or the second input plate member 111 or 112.

The ring gear 25 of the planetary gear 21 is configured to include an annular gear body 250 having inner teeth 25t in an inner circumference thereof, two annular-shaped side plates 251, a plurality of rivets 252 for fixing the each side plate 251 to both axial side face of the gear body 250. The gear body 250, the two side plates 251 and the plurality of rivets 252 are integrated each other and work as a mass body of the rotary inertia mass damper 20. In this embodiment, the inner teeth 25t are formed on the entire inner circumference of the gear body 250. The inner teeth 25t may be formed on a plurality of predetermined portions of the inner circumferential surface of the gear body 250 at intervals (at equal intervals) in the circumferential direction. As shown in FIG. 3, recessed portions may be formed on an outer circumferential surface of the gear body 250 such as to adjust a weight of the ring gear 25.

Each of the side plates 251 has a concave cylindrically shaped inner circumferential surface and works as a supported portion that is axially supported by the plurality of pinion gears 23 engaging with the inner teeth 25t. That is, in both axial ends of the inner teeth 25t, the two side plates 251 are respectively fixed to the corresponding side face of the gear body 250 such as to protrude inside bottoms of the inner teeth 25t in the radial direction and oppose to at least the side face of the gear teeth 23t of the pinion gear 23. As shown in FIG. 4, in this embodiment, the inner circumferential surface of each side plate 251 is located slightly inside tips of the inner teeth 25t.

When each of the pinion gears 23 meshes with the inner teeth 25t, the inner circumferential surface of each side plate 251 is supported by the corresponding radially supporting portion 230s of the pinion gear 23 (gear body 230). This enables the ring gear 25 to be accurately aligned with respect to the axial center of the driven member 15 or the sun gear by the radially supporting portions 230s of the plurality of pinion gears 23 and to smoothly rotate (oscillate). Further, when each of the pinion gears 23 meshes with the inner teeth 25t, an inner face of each side plate 251 opposes to the side face of the gear teeth 23t of the pinion gear 23 and a side face of a portion from the bottoms of the gear teeth 23t to the radially supporting portion 230s. Accordingly, an axial motion of the ring gear 25 is restricted by at least the side face of the gear teeth 23t of the pinion gear 23. Further, as shown in FIG. 4, an axial gap is defined between an outer face of each side plate 251 of the ring gear 25 and the pinion gear supporting portion 115 or 116 (flanged portion 115f or 116f) of the first or the second input plate member 111 or 112.

When the lockup by the lockup clutch 8 is released in the starting device 1 with the configuration described above, as seen from FIG. 1, the torque (power) transmitted from the engine EG to the front cover 3 is transmitted to the input shaft IS of the transmission TM via the path of the pump impeller 4, the turbine runner 5, the driven member 15 and the damper hub 7. When the lockup is executed by the lockup clutch 8 of the starting device 1, on the other hand, the torque transmitted from the engine EG to the drive member 11 via the front cover 3 and the lockup clutch 8 is transmitted to the driven member 15 and the damper hub 7 via the first torque transmission path TP1 including the plurality of first springs SP1, the intermediate member 12 and the plurality of second springs SP2, and the rotary inertia mass damper 20 until the input torque reaches the above torque T1. When the input torque becomes equal to or higher than the above torque T1, the torque transmitted to the drive member 11 is transmitted to the driven member 15 and the damper hub 7 via the first torque transmission path TP1, the second torque transmission path TP2 including the plurality of inner springs SPi, and the rotary inertia mass damper 20.

When the drive member 11 is rotated (twisted) relative to the driven member 15 under an execution of the lockup (engagement of the lockup clutch 8), the first and the second springs SP1 and SP2 are deflected, and the ring gear 25 or the mass body is rotated (oscillated) about the axial center in accordance with relative rotation of the drive member 11 to the driven member 15. More specifically, when the drive member 11 is rotated (oscillated) relative to the driven member 15, the rotation speed of the drive member 11 (first and the second input plate members 111 and 112) or the carrier which is an input element of the planetary gear 21 becomes higher than the rotation speed of the driven member 15 or the sun gear. In such a state, the rotation speed of the ring gear 25 is increased by the action of the planetary gear 21, so that the ring gear 25 is rotated at a higher rotation speed than the rotation speed of the drive member 11. This causes an inertia torque to be applied from the ring gear 25 that is the mass body of the rotary inertia mass damper 20 to the driven member 15 that is the output element of the damper device 10 via the pinion gears 23 and thereby damps the vibration of the driven member 15. The rotary inertia mass damper 20 is configured to mainly transmit the inertia torque between the drive member 11 and the driven member 15 but not to transmit an average torque.

The following describes a design procedure of the damper device 10.

As described above, in the damper device 10, until the input torque transmitted to the drive member 11 reaches the above torque T1, the first and the second springs SP1 and SP2 included in the first torque transmission path TP1 work in parallel to the rotary inertia mass damper 20. When the first and the second springs SP1 and SP2 work in parallel to the rotary inertia mass damper 20, the torque transmitted from the first torque transmission path TP1 including the intermediate member 12 and the first and the second springs SP1 and SP2 to the driven member 15 depends on (is proportional to) the displacement (amount of deflection or torsion angle) of the second springs SP2 between the intermediate member 12 and the driven member 15. The torque transmitted from the rotary inertia mass damper 20 to the driven member 15, on the other hand, depends on (is proportional to) a difference in angular acceleration between the drive member 11 and the driven member 15, i.e., a second order differential equation result of the displacement of the first and the second springs SP1 and SP2 between the drive member 11 and the driven member 15. On the assumption that the input torque transmitted to the drive member 11 of the damper device 10 is periodically vibrated as shown by Equation (1) given below, the phase of the vibration transmitted from the drive member 11 to the driven member 15 via the first torque transmission path TP1 is accordingly shifted by 180 degrees from the phase of the vibration transmitted from the drive member 11 to the driven member 15 via the rotary inertia mass damper 20.

[Math. 1]

$$T = T_0 \sin \omega t \quad (1)$$

Additionally, in the damper device 10 including the single intermediate member 12, two resonances occur in the first torque transmission path TP1 when the deflections of the first and the second springs SP1 and SP2 are allowed and the inner springs SPi are not deflected. That is, a resonance (first resonance) of the entire damper device 10 occurs in the first torque transmission path TP1 by the vibrations of the drive member 11 and the driven member 15 in the opposite phases when the deflections of the first and the second springs SP1, SP2 are allowed and the inner springs SPi are not deflected. A resonance (second resonance) also occurs in the first torque transmission path TP1 by the vibrations of the intermediate member 12 in the opposite phase to both the drive member 11 and the driven member 15 when the deflections of the first and the second springs SP1, SP2 are allowed and the inner springs SPi are not deflected, at a higher rotation speed side (higher frequency side) than the first resonance.

In order to further improve the vibration damping effect of the damper device 10 with the above characteristics, as the result of intensive studies and analyses, the inventors have noted that the damper device 10 can damp the vibration of the driven member 15 by making the amplitude of the vibration of the first torque transmission path TP1 equal to the amplitude of the vibration of the rotary inertia mass damper 20 in the opposite phase. The inventors have established an equation of motion as shown by Equation (2) given below in a vibration system including the damper device 10 in which the torque is transmitted from the engine EG to the drive member 11 under engagement of the lockup clutch and the inner springs SPi are not deflected. In Equation (2), "$J_1$" denotes a moment of inertia of the drive member 11, "$J_2$" denotes a moment of inertia of the intermediate member 12 as described above, "$J_3$" denotes a moment of inertia of the driven member 15, and "$J_i$" denotes a moment of inertia of the ring gear 25 that is the mass body of the rotary inertia mass damper 20. Further, "$\theta_1$" denotes a torsion angle of the drive member 11, "$\theta_2$" denotes a torsion angle of the intermediate member 12, "$\theta_3$" denotes a torsion angle of the driven member 15. Furthermore, "k1" denotes a combined spring constant of the plurality of first springs SP1 working in parallel between the drive member 11 and the intermediate member 12, "k2" denotes a combined spring constant of the plurality of second springs SP2 working in parallel between the intermediate member 12 and the driven member 15. Additionally, "$\lambda$" denotes a gear ratio of the planetary gear 21 (a pitch circle diameter of the outer teeth 15t (sun gear)/a pitch circle diameter of the inner teeth 25t of the ring gear 25) included in the rotary inertia mass damper 20, that is, a ratio of a rotational speed of the ring gear 25 or the mass body with respect to a rotational speed of the driven member 15, and "T" denotes an input torque transmitted to the drive member from the engine EG.

[Math. 2]

$$\begin{bmatrix} J_1 + J_i \cdot (1+\lambda)^2 & 0 & -J_i \cdot \lambda \cdot (1+\lambda) \\ 0 & J_2 & 0 \\ -J_i \cdot \lambda \cdot (1+\lambda) & 0 & J_3 + J_i \cdot \lambda^2 \end{bmatrix} \begin{bmatrix} \ddot{\theta}_1 \\ \ddot{\theta}_2 \\ \ddot{\theta}_3 \end{bmatrix} + \begin{bmatrix} k_1 & -k_1 & 0 \\ -k_1 & k_1+k_2 & -k_2 \\ 0 & -k_2 & k_2 \end{bmatrix} \begin{bmatrix} \theta_1 \\ \theta_2 \\ \theta_3 \end{bmatrix} = \begin{bmatrix} T_1 \\ 0 \\ 0 \end{bmatrix} \quad (2)$$

Additionally, the inventors have assumed that the input torque T is periodically vibrated as shown by Equation (1) given above and have also assumed that the torsion angle $\theta_1$ of the drive member 11, the torsion angle $\theta_2$ of the intermediate member 12 and the torsion angle $\theta_3$ of the driven member 15 are periodically responded (vibrated) as shown by Equation (3) given below. In Equations (1) and (3), "w" denotes an angular frequency in the periodical fluctuation (vibration) of the input torque T. In Equation (3), "$\Theta_1$" denotes an amplitude of the vibration (vibration amplitude, i.e., maximum torsion angle) of the drive member 11 generated during transmission of the torque from the engine EG, "$\Theta_2$" denotes an amplitude of vibration (vibration amplitude) of the intermediate member 12 generated during transmission of the torque from the engine EG to the drive member 11, and "$\Theta_3$" denotes an amplitude of vibration (vibration amplitude) of the driven member 15 generated during transmission of the torque from the engine EG to the drive member 11. On such assumptions, an identity of Equation (4) given below is obtained by substituting Equations (1) and (3) into Equation (2) and eliminating "sin $\omega t$" from both sides.

[Math. 3]

$$\begin{bmatrix} \theta_1 \\ \theta_2 \\ \theta_3 \end{bmatrix} = \begin{bmatrix} \Theta_1 \\ \Theta_2 \\ \Theta_3 \end{bmatrix} \sin \omega t \quad (3)$$

-continued $$\begin{bmatrix} T_1 \\ 0 \\ 0 \end{bmatrix} = \begin{bmatrix} k_1 - \omega^2\{J_1 + J_i \cdot (1+\lambda)^2\} & -k_1 & \omega^2 \cdot J_i \cdot \lambda \cdot (1+\lambda) \\ -k_1 & k_1 + k_2 - \omega^2 \cdot J_2 & -k_2 \\ \omega^2 \cdot J_i \cdot \lambda \cdot (1+\lambda) & -k_2 & k_2 - \omega^2(J_3 + J_i \cdot \lambda^2) \end{bmatrix} \begin{bmatrix} \Theta_1 \\ \Theta_2 \\ \Theta_3 \end{bmatrix} \quad (4)$$

In Equation (4), when the vibration amplitude $\Theta_3$ of the driven member 15 is zero, this means that the vibration from the engine EG is theoretically damped completely by the damper device 10 and that no vibration is theoretically transmitted to the transmission TM, the driveshaft and the like located downstream of the driven member 15. From this point of view, the inventors have obtained a conditional expression of Equation (5) by solving the identity of Equation (4) with respect to the vibration amplitude $\Theta_3$ and setting $\Theta_3=0$. Equation (5) is a quadratic equation with regard to the square of angular frequency $\omega^2$ in the periodical fluctuation $\omega^2$ the input torque T. When the square of angular frequency $\omega^2$ is either of two real roots (or multiple root) of Equation (5), the vibration from the engine EG transmitted from the drive member 11 to the driven member 15 via the first torque transmission path TP1 and the vibration transmitted from the drive member 11 to the driven member 15 via the rotary inertia mass damper 20 are cancelled out each other, and the vibration amplitude $\Theta_3$ of the driven member 15 theoretically becomes equal to zero.

[Math. 4]

$$J_2 \cdot J_i \cdot \lambda(1+\lambda) \cdot (\omega^2)^2 - J_i \cdot \lambda(1+\lambda) \cdot (k_1+k_2) \cdot \omega^2 + k_1 \cdot k_2 = 0 \quad (5)$$

Figure 5:
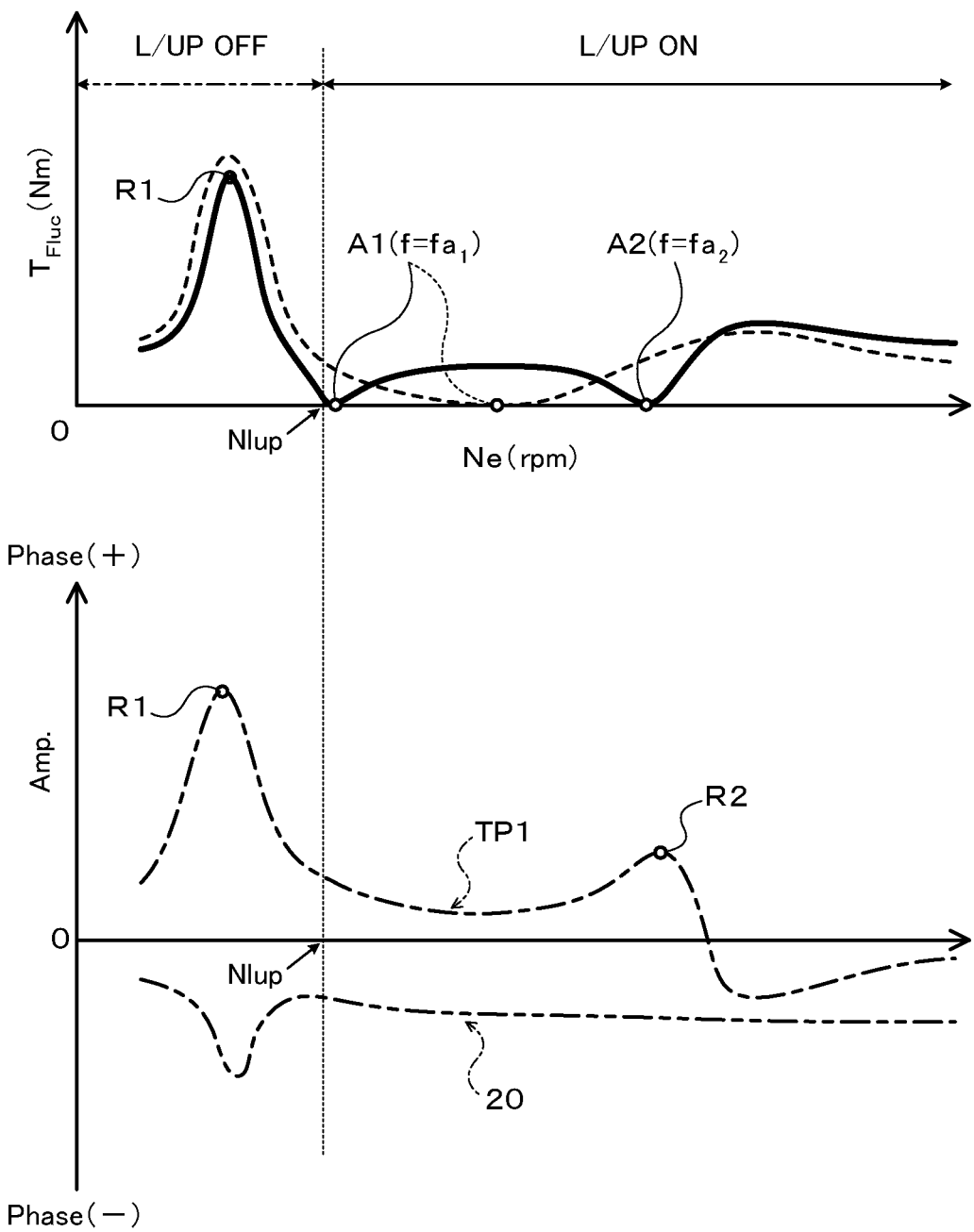
FIG. 5 is a diagram illustrating a relationship of rotation speed of an engine to torque variation $T_{Fluc}$ at an output element in the damper device of FIG. 1 and other drawings.

This result of analysis indicates that a total of two antiresonance points (A1 and A2 in FIG. 5) providing theoretically zero vibration amplitude $\Theta_3$ of the driven member 15 may be set in the damper device 10 that includes the intermediate member 12 and accordingly provides two peaks, i.e., a resonance in the torque transmitted via the first torque transmission path TP1 as shown in FIG. 5. The damper device 10 can thus significantly effectively damp the vibration of the driven member 15 by making the amplitude of the vibration of the first torque transmission path TP1 equal to the amplitude of the vibration of the rotary inertia mass damper 20 in the opposite phase at two points corresponding to the two resonances occurring in the first torque transmission path TP1.

Additionally, in the damper device 10, the resonance of the intermediate member 12 occurs in the stage where the rotation speed of the drive member 11 becomes rather higher than a rotation speed corresponding to the frequency at an antiresonance point A1 of a lower rotation speed side (lower frequency side). The amplitude of the vibration transmitted from the second springs SP2 to the driven member 15 changes from decreasing to increasing before the rotation speed of the drive member 11 (engine EG) reaches a rotation speed corresponding to the relatively low natural frequency of the intermediate member 12, as shown by a one-dot chain line curve in FIG. 5. Even when the amplitude of the vibration transmitted from the rotary inertia mass damper 20 to the driven member 15 is gradually increased with an increase in rotation speed of the drive member 11 (as shown by a two-dot chain line curve in FIG. 5), this expands an area where the vibration transmitted from the rotary inertia mass damper 20 to the driven member 15 cancels out at least part of the vibration transmitted from the second springs SP2 to the driven member 15. This results in further improving the vibration damping performance of the damper device 10 in a relatively low rotation speed range of the drive member 11.

A vehicle equipped with the engine EG as the source of generating power for driving may be configured as to further decrease a lockup rotation speed Nlup of the lockup clutch 8 (rotation speed at the time of first coupling of the engine EG with the damper device 10 after a start of the engine EG and the lowest among a plurality of lockup rotation speeds; in other words, minimum rotation speed in a rotation speed range where the torque is transmitted from the drive member 11 through the torque transmission path TP1 to the driven member 15) and mechanically transmit the torque from the engine EG to the transmission TM at an earlier timing, such as to improve the power transmission efficiency between the engine EG and the transmission TM and thereby further improve the fuel consumption of the engine EG. The vibration transmitted from the engine EG via the lockup clutch 8 to the drive member 11, however, increases in a low rotation speed range of approximately 500 rpm to 1500 rpm that is likely to be set as a range of the lockup rotation speed Nlup. The vibration level significantly increases especially in a vehicle equipped with a smaller-number cylinder engine such as three-cylinder engine or four-cylinder engine. Accordingly, in order to suppress transmission of a large vibration to the transmission TM and so on during or immediately after engagement the lockup, there is a need to further reduce the vibration level in a rotation speed range of about the lockup rotation speed Nlup of the entire damper device 10 (driven member 15) configured to transmit the torque (vibration) from the engine EG to the transmission TM under engagement of the lockup.

By taking into account the foregoing, the inventors have configured the damper device 10 such as to form the antiresonance point A1 of the lower rotation speed side (lower frequency side) when the rotation speed Ne of the engine EG is in the range of 500 rpm to 1500 rpm (in the expected setting range of the lockup rotation speed Nlup), based on the predetermined lockup rotation speed Nlup of the lockup clutch 8. Two solutions $\omega_1$ and $\omega_2$ of Equation (5) given above may be obtained as Equations (6) and (7) given below according to the quadratic formula, and satisfy $\omega_1 < \omega_2$. A frequency $fa_1$ at the antiresonance point A1 of the lower rotation speed side (lower frequency side) (hereinafter referred to as "minimum frequency") is expressed by Equation (8) given below, and a frequency $fa_2$ at an antiresonance point A2 of the higher rotation speed side (higher frequency side) ($fa_2 > fa_1$) is expressed by Equation (9) given below. A rotation speed $Nea_1$ of the engine EG corresponding to the minimum frequency $fa_1$ is expressed as $Nea_1 = (120/n) \cdot fa_1$, where "n" denotes the number of cylinders of the engine EG.

[Math. 5]

$$\omega_1^2 = \frac{(k_1+k_2) - \sqrt{(k_1+k_2)^2 - 4 \cdot \frac{J_2}{J_i} \cdot k_1 \cdot k_2 \cdot \frac{1}{\lambda(1+\lambda)}}}{2 \cdot J_2} \quad (6)$$

$$\omega_2^2 = \frac{(k_1+k_2) + \sqrt{(k_1+k_2)^2 - 4 \cdot \frac{J_2}{J_i} \cdot k_1 \cdot k_2 \cdot \frac{1}{\lambda(1+\lambda)}}}{2 \cdot J_2} \quad (7)$$

-continued $$fa_1 = \frac{1}{2\pi}\sqrt{\frac{(k_1+k_2) - \sqrt{(k_1+k_2)^2 - 4\cdot\frac{J_2}{J_i}\cdot k_1\cdot k_2\cdot\frac{1}{\lambda(1+\lambda)}}}{2\cdot J_2}} \quad (8)$$

$$fa_2 = \frac{1}{2\pi}\sqrt{\frac{(k_1+k_2) + \sqrt{(k_1+k_2)^2 - 4\cdot\frac{J_2}{J_i}\cdot k_1\cdot k_2\cdot\frac{1}{\lambda(1+\lambda)}}}{2\cdot J_2}} \quad (9)$$

Accordingly, the combined spring constant $k_1$ of the plurality of first springs SP1, the combined spring constant $k_2$ of the plurality of second springs SP2, the moment of inertia $J_2$ of the intermediate member 12 (determined by taking into account (summing up) the moments of inertia of the turbine runner 5 and the like coupled to be integrally rotated), and the moment of inertia $J_i$ of the ring gear 25 that is the mass body of the rotary inertia mass damper 20 are selected and set in the damper device 10, in order to satisfy Expression (10) given below. More specifically, in the damper device 10, the spring constants $k_1$ and $k_2$ of the first and the second springs SP1 and SP2, the moment of inertia $J_2$ of the intermediate member 12, the moment of inertia $J_i$ of the ring gear 25, and the gear ratio λ of the planetary gear 21 are determined, based on the above minimum frequency $fa_1$ (and the lockup rotation speed Nlup). When designing the damper device 10, a moment of the inertia of the pinion gear 23 may be ignored in practice as shown in Equations (2)-(9) and may be taken into account in the above equation (2) and the like. Further, the spring constants $k_1$ and $k_2$ of the first and the second springs SP1 and SP2, the moment of inertia $J_2$ of the intermediate member 12, the moment of inertia $J_1$ of the ring gear 25, the gear ratio λ of the planetary gear 21, and the moment of the inertia of the pinion gear 23 may be determined, based on the above minimum frequency $fa_1$ (and the lockup rotation speed Nlup).

[Math. 6]

$$500 \text{ rpm} \leq \frac{120}{n} fa_1 \leq 1500 \text{ rpm} \quad (10)$$

As described above, the antiresonance point A1 of the lower rotation speed side that is likely to provide theoretically zero vibration amplitude $\Theta_3$ of the driven member 15 (that is likely to further decrease the vibration amplitude $\Theta_3$) may be set in the low rotation speed range of 500 rpm to 1500 rpm (in the expected setting range of the lockup rotation speed Nlup). This results in allowing for the lockup (coupling of the engine EG with the drive member 11) at the lower rotation speed.

When the damper device 10 is configured to satisfy Expression (10), it is preferable to select and set the spring constants $k_1$ and $k_2$ and the moments of inertia $J_2$ and $J_i$, such as to minimize the frequency of the lower rotation-speed (lower-frequency) side resonance (at a resonance point R1) occurring in the first torque transmission path TP1 to the minimum possible value that is lower than the above minimum frequency $fa_1$. This further reduces the minimum frequency $fa_1$ and allows for the lockup at the further lower rotation speed.

Moreover, the configuration capable of setting two antiresonance points A1 and A2 enables the antiresonance point A1 having the minimum frequency ($fa_1$) between the two antiresonance points A1 and A2 to be shifted toward the lower frequency side, compared with the configuration that only one antiresonance point is set (shown by a broken line curve in FIG. 5). Additionally, as seen from FIG. 5, the configuration that the two antiresonance points A1 and A2 are set enables the vibration from the engine EG transmitted from the drive member 11 to the driven member 15 via the first torque transmission path TP1 (shown by the one-dot chain line curve in FIG. 5) to be effectively damped by the vibration transmitted from the drive member 11 to the driven member 15 via the rotary inertia mass damper 20 (shown by the two-dot chain line curve in FIG. 5) in a relatively wide rotation speed range between the two antiresonance points A1 and A2.

This further improves the vibration damping effect of the damper device 10 in the lower rotation speed range of a lockup area that is likely to increase the vibration from the engine EG. In the damper device 10, on the occurrence of the second resonance (resonance as shown by the resonance point R2 in FIG. 5), the intermediate member 12 is vibrated in the opposite phase to that of the driven member 15. As shown by the one-dot chain line curve in FIG. 5, the phase of the vibration transmitted from the drive member 11 to the driven member 15 via the first torque transmission path TP1 becomes identical with the phase of the vibration transmitted from the drive member 11 to the driven member 15 via the rotary inertia mass damper 20.

In the damper device 10 configured as described above, in order to further improve the vibration damping performance around the lockup rotation speed Nlup, there is a need to appropriately separate the lockup rotation speed Nlup and the rotation speed Ne of the engine EG corresponding to the resonance point R2. Accordingly, when the damper device 10 is configured to satisfy Expression (10), it is preferable to select and set the spring constants $k_1$ and $k_2$ and the moments of inertia $J_2$ and $J_i$, such as to satisfy Nlup≤(120/n)·$fa_1$ (=Nea$_1$). This engages the lockup by the lockup clutch 8, while effectively suppressing transmission of the vibration to the input shaft IS of the transmission TM. This also enables the vibration from the engine EG to be remarkably effectively damped by the damper device 10, immediately after engagement of the lockup.

As described above, designing the damper device 10 based on the frequency (minimum frequency) $fa_1$ at the antiresonance point A1 remarkably effectively improves the vibration damping performance of the damper device 10. According to the inventors' studies and analyses, it has been confirmed that when the lockup rotation speed Nlup is set to, for example, a value of about 1000 rpm, the damper device 10 configured to satisfy, for example, 900 rpm≤(120/n)·$fa_1$≤1200 rpm provides the remarkably effective results in practice.

On the other hand, it is necessary to decrease both a hysteresis of the first torque transmission path TP1 including the intermediate member 12, the first and the second springs SP1 and SP2 and a hysteresis of the rotary inertia mass damper 20 as much as possible such as to decrease an actual vibration amplitude of the driven member 15 about the antiresonance points A1 and A2. That is, in the damper device 10, it is necessary to decrease both a phase shift of a vibration transmitted to the driven member 15 via the first torque transmission path TP1, the phase shift caused by the hysteresis of the first and second springs SP1 and SP2, and a phase shift of a vibration transmitted to the driven member 15 via the rotary inertia mass damper 20, the phase shift caused by the hysteresis of the rotary inertia mass damper 20.

Therefore, in the damper device 10, the driven member 15 working as the sun gear of the planetary gear 21 of the rotary inertia mass damper 20 is provided with the outer teeth 15t located radially outside the first and the second springs SP1 and SP2 that transmit the torque between the drive member 11 and the driven member 15. That is, the first and the second springs SP1 and SP2 are disposed radially inside the planetary gear 21 of the rotary inertia mass damper 20. Accordingly, the centrifugal force applied to the first and the second springs SP1 and SP2 is reduced, thereby decreasing a frictional force (sliding resistance) that occurs when the first and the second springs SP1 and SP2 are pressed against the spring supporting portions 121s and 122 by the centrifugal force. As a result, the hysteresis of the first and the second springs SP1 and SP2 is satisfactorily decreased in the damper device 10.

Furthermore, an energy loss caused by the hysteresis of the rotary inertia mass damper 20 may be expressed as Jh=ΔT·θ. Herein "Jh" denotes energy loss caused by the hysteresis of the rotary inertia mass damper 20, "ΔT" denotes a torque difference, that is, a difference between the torque transmitted to the driven member 15 (sun gear) from the rotary inertia mass damper 20 when a relative displacement between the drive member 11 and the driven member 15 increases and a torque transmitted to the driven member 15 (sun gear) from the rotary inertia mass damper 20 when the relative displacement between the drive member 11 and the driven member 15 decreases, and "θ" denotes a torsion angle of the drive member 11 relative to the driven member 15. Further, the energy loss Jh may be expressed as Jh=μ·Fr·x. Herein "μ" denotes a coefficient of dynamic friction between the ring gear 25 and the pinion gear 23, "Fr" denotes a vertical load (axial force) applied to the ring gear 25 according to a pressure in the fluid chamber 9 for example, and "x" denotes a sliding distance of the ring gear 25 with respect to the pinion gear 23.

Accordingly, a relationship ΔT·θ=μ·Fr·x is satisfied. By differentiating both sides of the relational expression by time, a relationship ΔT·dθ/dt=μ·Fr·dx/dt is derived. The torque difference ΔT or the hysteresis of the rotary inertia mass damper 20 thus may be expressed as ΔT=μ·Fr·(dx/dt)/(dθ/dt). The time differential value dx/dt of the sliding distance x in the right side of the relational expression showing the torque difference ΔT shows a relative speed Vrp between the ring gear 25 and the pinion gears 23. The hysteresis of the rotary inertia mass damper 20 thus becomes smaller as the relative speed Vrp between the ring gear 25 and the pinion gears 23 that support the ring gear 25, that is, a relative speed between the mass body and a support member that restricts an axial motion of the mass body becomes smaller.

Figure 6:
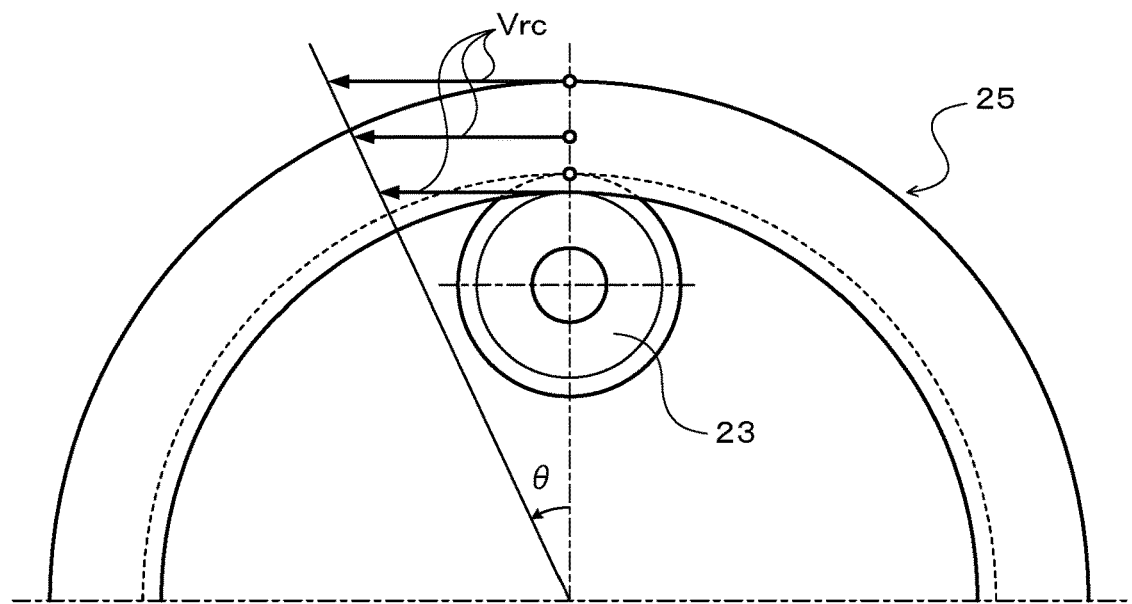
FIG. 6 is a schematic diagram illustrating a relative velocity between a ring gear of the rotary inertia mass damper and a drive member of the damper device.

When the ring gear 25 or the mass body is supported from both sides by the first and the second input plate members 111 and 112 of the drive member 11 or the carrier of the planetary gear 21, the hysteresis of the rotary inertia mass damper 20 depends on a relative speed Vrc between the ring gear 25 and the drive member 11. FIG. 6 shows the relative speed Vrc between the ring gear 25 and the drive member 11 when the drive member 11 is twisted in the angle θ with respect to the driven member 15. As shown in FIG. 6, the relative speed Vrc is relatively large about the inner circumference of the ring gear 25 and becomes larger from the inner circumference to the outer circumference of the ring gear 25. The hysteresis of the rotary inertia mass damper 20 is not favorably decreased when the ring gear 25 or the mass body is supported from both sides by the first and the second input plate members 111 and 112.

Figure 7:
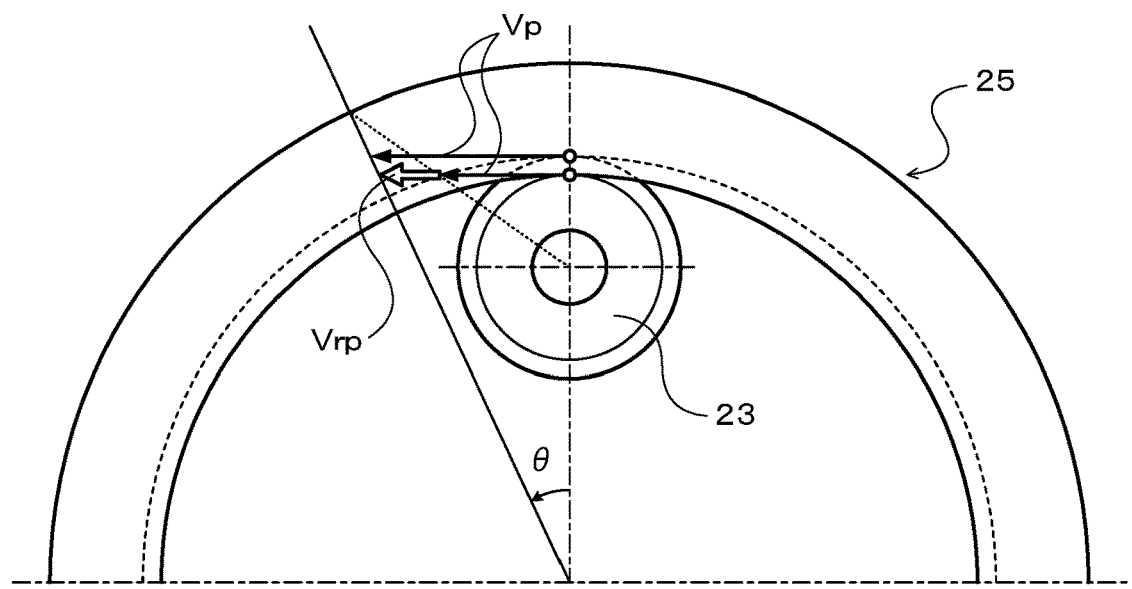
FIG. 7 is a schematic diagram illustrating a relative velocity between the ring gear and a pinion gear of the rotary inertia mass damper.
Figure 8:
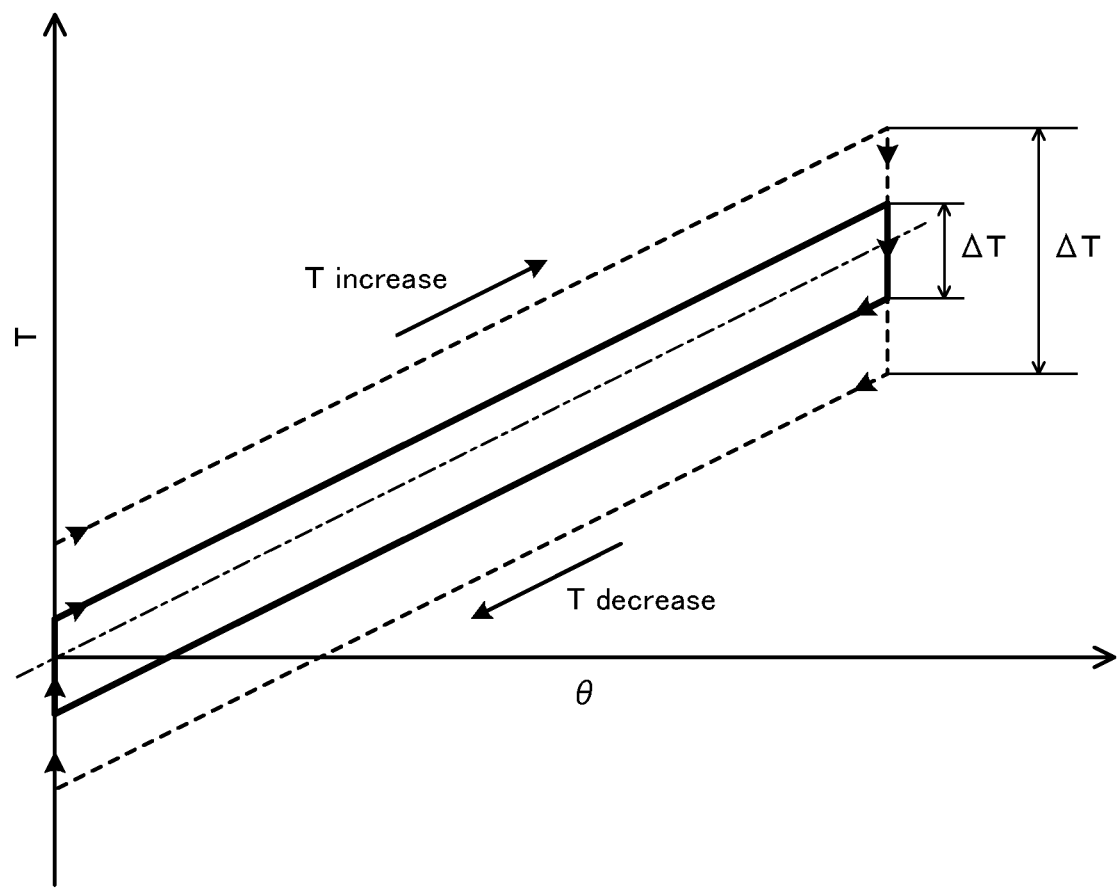
FIG. 8 is a schematic diagram illustrating a torque difference obtained by quantifying a hysteresis of the rotary inertia mass damper of the damper device according to the disclosure.

On the other hand, the pinion gears 23 revolve at a peripheral speed Vp that is identical with a peripheral speed of the first and the second input plate members 111 and 112 or the carrier and rotate about the pinion shaft 24. The relative speed Vrp between the ring gear 25 and the pinion gear 23 becomes substantially zero about an engagement position (a point on a broken line in FIGS. 6 and 7) between the inner tooth 25t of the ring gear 25 and the gear tooth 23t of the pinion gear 23. As illustrated by a white arrow in FIG. 7, the relative speed Vrp between the ring gear 25 and the pinion gear 23 becomes significantly smaller than the relative speed Vrc between the ring gear 25 and the drive member 11 (carrier) and smaller than the relative speed (not shown) between the ring gear 25 and the driven member 15 (sun gear). In the damper device 10 in which the axial motion of the ring gear 25 or the mass body is restricted by the pinion gears 23 of the planetary gear 21, as illustrated by a solid line in FIG. 8, the hysteresis of the rotary inertia mass damper 20, that is, the torque difference ΔT is satisfactorily decreased, compared with supporting the ring gear 25 from both sides by the first and second input plate members 111 and 112 (see a broken line in FIG. 8).

In this embodiment, the ring gear 25 includes the two side plates 251 (supported portions) fixed to each of the side face of the gear body 250 in such a manner that the inner circumferential surface of each side plate 251 is located slightly inside tips of the inner teeth 25t. Further, the axial motion of the ring gear 25 is restricted by at least the side face of gear teeth 23t of the pinion gears 23. Accordingly, the axial motion of the ring gear 25 can be restricted by the pinion gears 23 at the engagement position between the inner tooth 25t and the gear tooth 23t where the relative speed Vrp between the ring gear 25 and the pinion gear 23 becomes substantially zero, thereby satisfactorily decreasing the hysteresis of the rotary inertia mass damper 20.

As described above, the damper device 10 satisfactorily decreases both the hysteresis in the first torque transmission path TP1 and the hysteresis in the rotary inertia mass damper 20, thereby favorably decreasing the actual vibration amplitude of the driven member 15 about the antiresonance points A1 and A2. Therefore, the vibration damping performance of the damper device 10 including the rotary inertia mass damper 20 is effectively improved by making the frequency fa₁ of the antiresonance point A1 of the lower rotation speed side equal to (closer to) a frequency of one vibration (resonance) to be damped by the damper device in the above range and making the frequency fa₂ of the antiresonance point A2 of the higher rotation speed side equal to (closer to) a frequency of the other vibration (resonance) to be damped by the damper device. Further, the vibration damping performance of the rotary inertia mass damper 20 is advantageously improved by decreasing the hysteresis of the rotary inertia mass damper 20 as has been described.

In the damper device 10, the driven member 15 or the sun gear, the plurality of pinion gears 23 and the ring gear 25 are arranged to at least partially overlap with the first and the second springs SP1 and SP2 (and the inner spring SPi) in the axial direction of the damper device 10 as viewed in the radial direction. This configuration further shortens the axial length of the damper device 10 and further increases the moment of inertia of the ring gear 25 by disposing the ring gear 25 in the outer circumference side of the damper device 10 while suppressing an increase of the weight of the ring gear 25 that works as the mass body of the rotary inertia mass damper 20, thereby enabling the inertia torque to be efficiently obtained.

Further, in the damper device 10, the rotation speed of the ring gear 25 or the mass body is increased by the action of the planetary gear 21 such as to be higher than the rotation speed of the drive member 11 (carrier). This reduces the weight of the ring gear 25 or the mass body while effectively ensuring the moment of inertia applied to the driven member 15 from the rotary inertia mass damper 20. This also enhances the flexibility in design of the rotary inertia mass damper 20 and the entire damper device 10. The rotary inertia mass damper 20 (planetary gear 21) may, however, be configured to decrease the rotation speed of the ring gear 25 to be lower than the rotation speed of the drive member 11, according to the magnitude of the moment of inertia of the ring gear 25 (mass body). Further, the planetary gear 21 may be a double pinion-type planetary gear. Furthermore, the outer tooth 15t of the driven member 15, the gear tooth 23t of the pinion gear 23 and the inner tooth 25t of the ring gear 25 may be a helical tooth with a helical tooth trace or a tooth with a straight tooth trace.

As described above, the configuration that two antiresonance points A1 and A2 are set enables the antiresonance point A1 to be shifted toward the lower frequency. Depending on the specification of the vehicle, the motor and so on equipped with the damper device 10, the multiple root of Equation (5) $(=\frac{1}{2}\pi\sqrt{J\{(k_1+k_2)/(2 \cdot J_2)\}}$ may be set to the above minimum frequency $fa_1$. Determining the spring constants $k_1$ and $k_2$ of the first and the second springs SP1 and SP2 and the moment of inertia $J_2$ of the intermediate member 12 based on the multiple root of Equation (5) also improves the vibration damping effect of the damper device 10 in the lower rotation speed range of the lockup area that is likely to increase the vibration from the engine EG as shown by the broken line curve in FIG. 5.

In the damper device 10 described above, springs having the identical specification (spring constant) are employed for the first and the second springs SP1 and SP2. This is, however, not restrictive. The spring constants $k_1$ and $k_2$ of the first and the second springs SP1 and SP2 may be different from each other ($k_1>k_2$ or $k_1<k_2$). This further increases the value of the $\sqrt{}$ term (discriminant) in Equations (6) and (8) and further increases the interval between the two antiresonance points A1 and A2, thus further improving the vibration damping effect of the damper device in the low frequency range (low rotation speed range). In this case, the damper device 10 may be provided with a stopper configured to restrict the deflection of one of the first and the second springs SP1 and SP2 (for example, one having the lower rigidity).

As described above, the ring gear 25 of the rotary inertia mass damper 20 includes two side plates 251 respectively fixed to the gear body 250 in such a manner that the inner circumferential surface of each side plate 251 is located slightly inside tips of the inner teeth 25t. However, each of the two side plates 251 may be fixed to the gear body 250 in such a manner that the inner circumferential surface of each side plate 251 is located radially inside bottoms of the inner teeth 25t and radially outside the pinion shaft 24 supporting the pinion gear 23. Further, a diameter of the radially supporting portion 230s of the pinion gear 23 (gear body 230) may also be reduced to be smaller than the above diameter. Namely, the inner circumferential surface of each side plate 251 of the ring gear 25 may be made close to the pinion shaft 24, so that the axial motion of the ring gear 25 is satisfactorily restricted by the pinion gears 23.

In order to restrict the axial motion of the ring gear 25 by the pinion gears 23, the pinion gear 23 may be provided with a pair of supporting portions that have an annular shape for example and protrude radially outside from both sides of the gear teeth 23t and the side plates 251 may be omitted from the ring gear 25. In such a configuration, the supporting portions of the pinion gear 23 may be formed such as to oppose to at least the side face of the inner teeth 25t of the ring gear 25 or a portion of the side face of the gear body 250.

Figure 9:
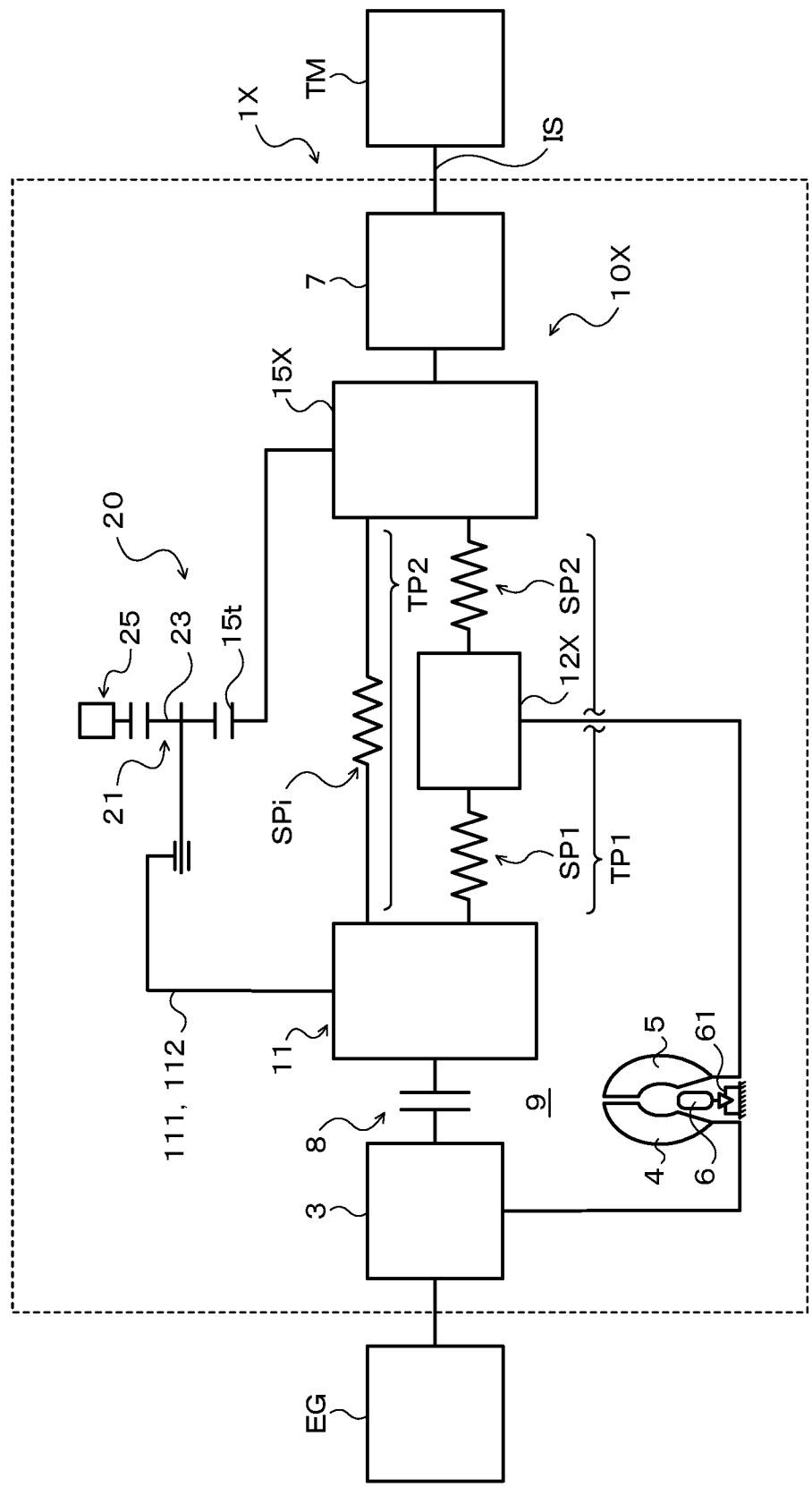
FIG. 9 is a schematic configuration diagram illustrating a starting device including a damper device according to another embodiment of the disclosure.

As in a damper device 10X of a starting device 1X shown in FIG. 9, an intermediate member 12X may be coupled with the turbine runner 5 to be integrally rotated instead of coupling the driven member 15X with the turbine runner 5 to be integrally rotated. This configuration allows for a further increase of the substantial moment of inertia $J_2$ of the intermediate member 12X (total moments of inertia of the intermediate member 12X, the turbine runner 5 and the like). In this configuration, as seen from the Equation (8), the frequency $fa_1$ of the antiresonance point A1 may be further reduced such as to set the antiresonance point A1 in the further lower rotation speed side (further lower frequency side).

In the damper devices 10, 10X, the sun gear of the planetary gear 21 may be coupled (integrated) with the drive member 11, and the driven members 15, 15X may be configured to work as the carrier of the planetary gear 21. Further, in the damper devices 10, 10X, the sun gear of the planetary gear 21 may be coupled (integrated) with the intermediate members 12, 12X, and the drive member 11 or the driven members 15, 15X may be configured to work as the carrier of the planetary gear 21. Furthermore, in the damper devices 10, 10X, the intermediate members 12, 12X may be configured to work as the carrier of the planetary gear 21, and the sun gear of the planetary gear 21 may be coupled (integrated) with the drive member 11 or the driven members 15, 15X.

Figure 10:
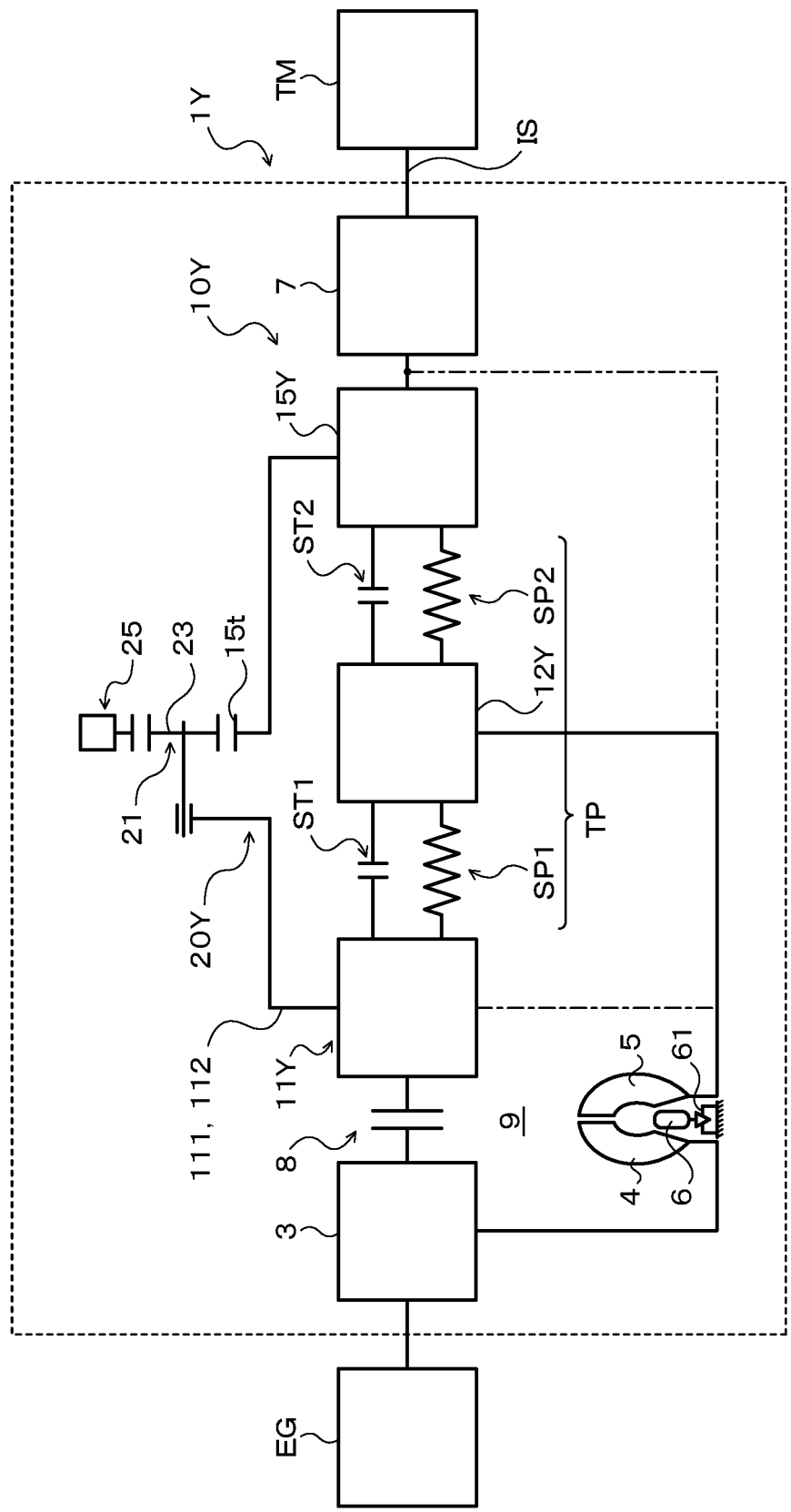
FIG. 10 is a schematic configuration diagram illustrating a starting device including a damper device according to yet another embodiment of the disclosure.

FIG. 10 is a schematic configuration diagram illustrating a starting device 1Y including a damper device 10Y according to another embodiment of the disclosure. Among the components of the starting device 1Y and the damper device 10Y, the same components to those of the starting device 1 and the damper device 10 described above are expressed by the same reference signs and their repeated description is omitted.

The damper device 10Y shown in FIG. 10 includes a drive member (input element) 11Y, an intermediate member (intermediate element) 12Y and a driven member (output element) 15Y, as rotational elements. The damper device 10Y also includes a plurality of first springs (first elastic bodies) SP1 configured to transmit the torque between the drive member 11Y and the intermediate member 12Y and a plurality of second springs (second elastic bodies) SP2 configured to respectively work in series with the corresponding first springs SP1 and to transmit the torque between the intermediate member 12Y and the driven member 15Y, as torque transmission elements (torque transmission elastic bodies). The plurality of first springs (first elastic bodies) SP1, the intermediate member 12Y and the plurality of second springs (second elastic bodies) SP2 configure a torque transmission path TP between the drive member 11Y and the driven member 15Y. As shown in the figure, the intermediate member 12Y is coupled with the turbine runner 5 to be integrally rotated. As shown by a two-dot chain line in FIG. 10, however, the turbine runner 5 may be coupled with either one of the drive member 11Y and the driven member 15Y.

As the above rotary inertia mass damper 20, a rotary inertia mass damper 20Y includes the single pinion-type planetary gear 21 and is arranged parallel to the torque transmission path TP between the drive member 11Y and the driven member 15Y. In the rotary inertia mass damper 20Y, the drive member 11Y (first and second input plate members 111 and 112) is configured to rotatably support the plurality of the pinion gears 23 such as to work as the carrier of the planetary gear 21. The driven member 15Y is configured to include outer teeth 15t and work as the sun gear of the planetary gear 21. In the rotary inertia mass damper 20Y, the axial motion of the ring gear 25 or the mass body is restricted by the pinion gear 23.

The damper device 10Y further includes a first stopper ST1 configured to restrict the relative rotation of the drive member 11Y to the intermediate member 12Y, i.e., deflection of the first springs SP1 and a second stopper ST2 configured to restrict the relative rotation of the intermediate member 12Y to the driven member 15Y, i.e., deflection of the second springs SP2. One of the first stopper ST1 and the second stopper ST2 is configured to restrict the relative rotation of the drive member 11Y to the intermediate member 12Y or the relative rotation of the intermediate member 12Y to the driven member 15Y when the input torque into the drive member 11Y reaches a predetermined torque T1 that is smaller than a torque T2 corresponding to a maximum torsion angle θmax of the damper device 10Y and the torsion angle of the drive member 11Y relative to the driven member 15Y becomes equal to or larger than a predetermined angle θref. The other of the first stopper ST1 and the second stopper ST2 is configured to restrict the relative rotation of the intermediate member 12Y to the driven member 15Y or the relative rotation of the drive member 11Y to the intermediate member 12Y when the input torque into the drive member 11Y reaches the torque T2.

This configuration allows for the deflections of the first and the second springs SP1 and SP2 until one of the first and the second stoppers ST1 an ST2 operates. When one of the first and the second stoppers ST1 and ST2 operates, the deflection of one of the first and the second springs SP1 and SP2 is restricted. When both the first and the second stoppers ST1 and ST2 operate, the deflections of both the first and the second springs SP1 and SP2 are restricted. The damper device 10Y accordingly has two-step (two-stage) damping characteristics. The first stopper ST1 or the second stopper ST2 may be configured such as to restrict the relative rotation of the drive member 11Y to the driven member 15Y.

The damper device 10Y configured as described above provides the similar operations and advantageous effects to those of the damper device 10 described above. In the damper device 10Y, one of the first and the second springs SP1 and SP2 may be arranged on the outer side in the radial direction of the other at intervals in the circumferential direction. More specifically, for example, the plurality of first springs SP1 may be arranged in an outer circumferential-side area in the fluid transmission chamber 9 at intervals in the circumferential direction. The plurality of second springs SP2 may be arranged on the inner side in the radial direction of the plurality of first springs SP1 at intervals in the circumferential direction. In this configuration, the first and the second springs SP1 and SP2 may be arranged to at least partially overlap with each other as viewed in the radial direction.

In the damper device 10Y, the sun gear of the planetary gear 21 may be coupled (integrated) with the drive member 11Y, and the driven member 15Y may be configured to work as the carrier of the planetary gear 21. Further, in the damper device 10Y, the sun gear of the planetary gear 21 may be coupled (integrated) with the intermediate member 12Y, and the drive member 11Y or the driven member 15Y may be configured to work as the carrier of the planetary gear 21. Furthermore, in the damper device 10Y, the intermediate member 12Y may be configured to work as the carrier of the planetary gear 21, and the sun gear of the planetary gear 21 may be coupled (integrated) with the drive member 11Y or the driven member 15Y.

Figure 11:
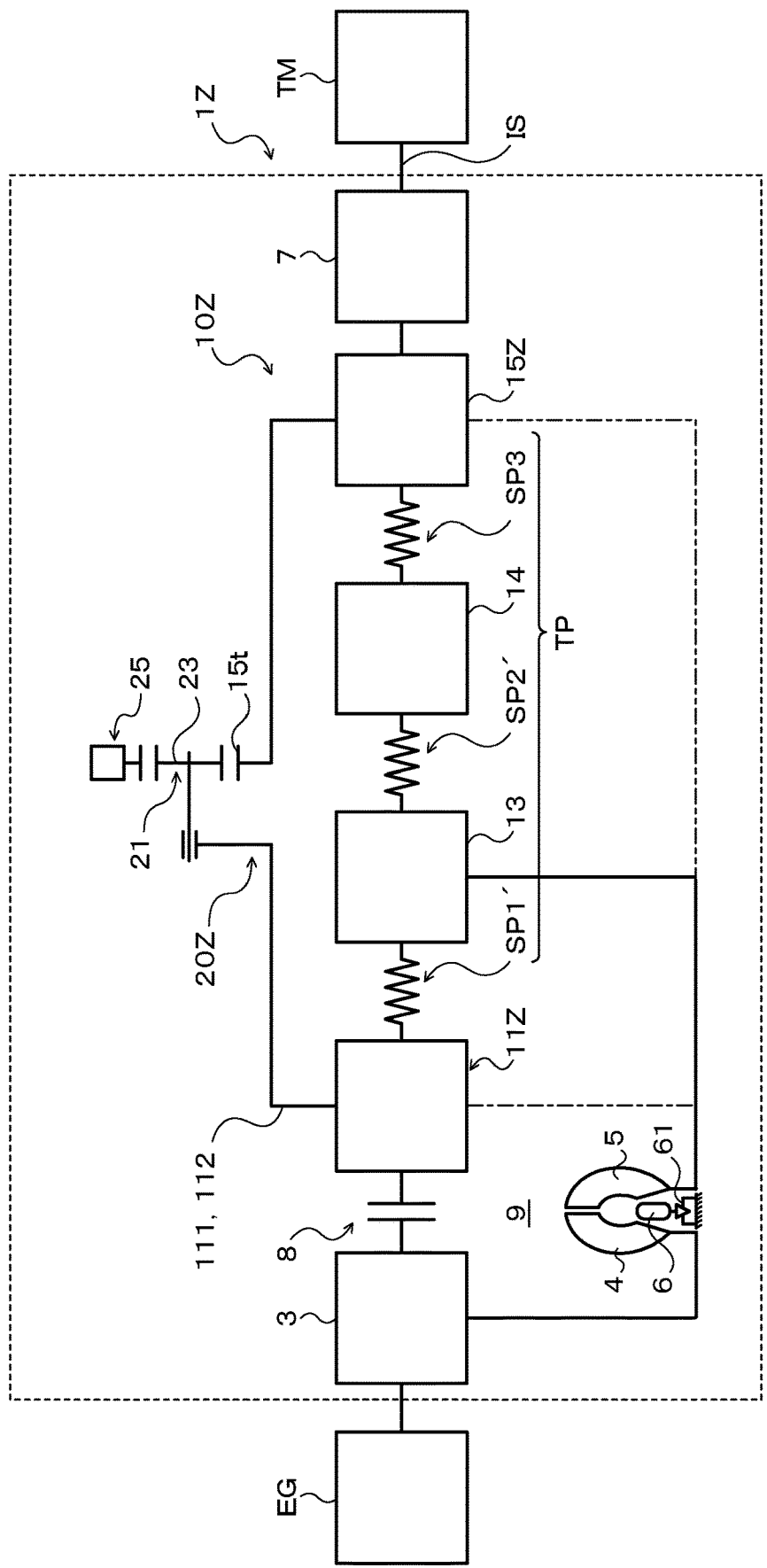
FIG. 11 is a schematic configuration diagram illustrating a starting device including a damper device according to another embodiment of the disclosure.

FIG. 11 is a schematic configuration diagram illustrating a starting device 1Z including a damper device 10Z according to yet another embodiment of the disclosure. Among the components of the starting device 1Z and the damper device 10Z, the same components to those of the starting device 1 and the damper device 10 described above are expressed by the same reference signs and their repeated description is omitted.

The damper device 10Z shown in FIG. 11 includes a drive member (input element) 11Z, a first intermediate member (first intermediate element) 13, a second intermediate member (second intermediate element) 14 and a driven member (output element) 15Z, as rotational elements. The damper device 10Z also includes a plurality of first springs (first elastic bodies) SP1' configured to transmit the torque between the drive member 11Z and the first intermediate member 13, a plurality of second springs (second elastic bodies) SP2' configured to transmit the torque between the first intermediate member 13 and the second intermediate member 14, and a plurality of third springs (third elastic bodies) SP3 configured to transmit the torque between the second intermediate member 14 and the driven member 15Z, as torque transmission elements (torque transmission elastic bodies). The plurality of first springs (first elastic bodies) SP1', the first intermediate member 13, the plurality of second springs (second elastic bodies) SP2', the second intermediate member 14 and the plurality of third springs SP3 configure a torque transmission path TP between the drive member 11Z and the driven member 15Z. As the rotary inertia mass dampers 20, 20Y, a rotary inertia mass damper 20Z includes the single pinion-type planetary gear 21 and is arranged parallel to the torque transmission path TP between the drive member 11Z and the driven member 15Z. The first intermediate member 13 is coupled with the turbine runner 5 to be integrally rotated. As shown by a two-dot chain line in FIG. 11, however, the turbine runner 5 may be coupled with either one of the drive member 11Z and the driven member 15Z.

In the damper device 10Z including the first and the second intermediate members 13 and 14, three resonances occur in the torque transmission path TP when the deflections of all the first to the third springs SP1', SP2' and SP3 are allowed. More specifically, a resonance of the entire damper device 10Z occurs in the torque transmission path TP by the vibrations of the drive member 11Z and the driven member 15Z in the opposite phases when the deflections of the first to the third springs SP1', SP2' and SP3 are allowed. A resonance also occurs in the torque transmission path TP by the vibrations of the first and the second intermediate members 13 and 14 in the opposite phase to both the drive member 11Z and the driven member 15Z when the deflections of the first to the third springs SP1', SP2' and SP3 are allowed. A resonance further occurs in the torque transmission path TP by the vibration of the first intermediate member 13 in the opposite phase to the drive member 11Z, the vibration of the second intermediate member 14 in the opposite phase to the first intermediate member 13 and the vibration of the driven member 15Z in the opposite phase to the second intermediate member 14 when the deflections of the first to the third springs SP1', SP2' and SP3 are allowed. This configuration thus enables a total of three antiresonance points, where the vibration transmitted from the drive member 11Z to the driven member 15Z via the torque transmission path TP and the vibration transmitted from the drive member 11Z to the driven member 15Z via the rotary inertia mass damper 20Z are theoretically cancelled out each other, to be set in the damper device 10Z.

Among the three antiresonance points that are likely to provide theoretically zero vibration amplitude of the driven member 15Z (that are likely to further decrease the vibration amplitude), a first antiresonance point of the lowest rotation speed may be set in the low rotation speed range of 500 rpm to 1500 rpm (in the expected setting range of the lockup rotation speed Nlup). This shifts one resonance having the minimum frequency of the resonances occurring in the torque transmission path TP toward the lower rotation speed side (toward the lower frequency side), such as to be included in a non-lockup area of the lockup clutch 8. This results in allowing for the lockup at the lower rotation speed and remarkably effectively improving the vibration damping performance of the damper device 10Z in the low rotation speed range that is likely to increase the vibration from the engine EG. The damper device 10Z may make a second antiresonance point of the higher rotation speed side (higher frequency side) than the first antiresonance point equal to (closer to), for example, resonance point (frequency thereof) of the input shaft IS of the transmission TM or may make a third antiresonance point of the higher rotation speed side (higher frequency side) than the second antiresonance point equal to (closer to), for example, a resonance point (frequency thereof) in the damper device 10Z, such as to effectively suppress the occurrence of such resonances.

The damper device 10Z may be configured such as to include three or more intermediate members in the torque transmission path TP. The turbine runner 5 may be coupled with the second intermediate member 14 or may be coupled with one of the drive member 11Z and the driven member 15Z as shown by a two-dot chain line in FIG. 11. In the damper device 10Z, the sun gear of the planetary gear 21 may be coupled (integrated) with the drive member 11Z, and the driven member 15Z may be configured to work as the carrier of the planetary gear 21. Further, in the damper device 10Z, the sun gear of the planetary gear 21 may be coupled (integrated) with the first intermediate member 13. The first intermediate member 13 may be configured to work as the carrier of the planetary gear 21 in the damper device 10Z.

Figure 12:
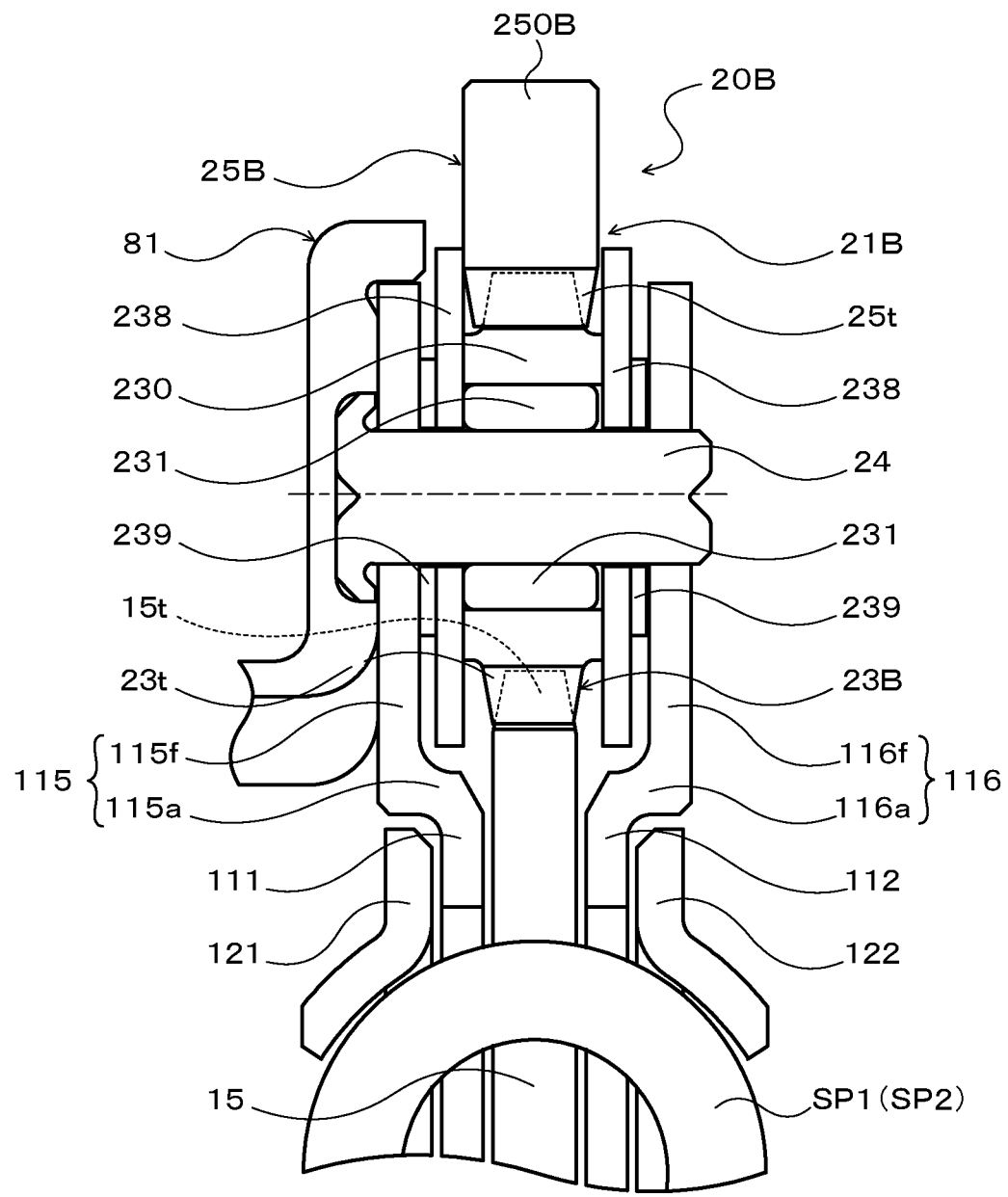
FIG. 12 is an enlarged view illustrating another rotary inertia mass damper according to the disclosure.

FIG. 12 is an enlarged view illustrating another rotary inertia mass damper 20B applicable to the above damper devices 10, 10X, 10Y, and 10Z. Among the components of the rotary inertia mass damper 20B, the same components to those of the above rotary inertia mass damper 20 described above are expressed by the same reference signs and their repeated description is omitted.

The planetary gear 21B of the rotary inertia mass damper 20B is configured by the driven member 15 that includes outer teeth 15t in the outer circumference thereof such as to work as a sun gear, the first and the second input plate members 111 and 112 that rotatably support the plurality of pinion gears 23B respectively engaging with the outer teeth 15t such as to work as a carrier, and a ring gear 25B that is disposed concentrically with the driven member 15 (15t) or the sun gear and has inner teeth 25t engaging with the each pinion gear 23B. The outer teeth 15t of the driven member 15 are located radially outside the first spring SP1, the second spring SP2 and the inner spring (not shown). In the fluid chamber, the driven member 15 or the sun gear, the plurality of pinion gears 23B and the ring gear 25B at least partially overlap with each other in the axial direction as viewed in the radial direction of the damper device.

As shown in FIG. 12, the pinion gears 23B of the planetary gear 21B are configured to include an annular gear body 230 having gear teeth (outer teeth) 23t in an outer circumference thereof, and a plurality of needle bearings 231 disposed between an inner circumferential surface of the gear body 230 and an outer circumferential surface of the pinion shaft 24. The ring gear 25B is an equivalent to the above ring gear 25 from which the two side plates 251 and the plurality of rivets are omitted and includes an annular portion 250B or the mass body and inner teeth 25t formed on an inner circumference of the annular portion 250B.

As shown in FIG. 12, larger-diameter washers 238 are disposed in both sides of each pinion gear 23B in the axial direction. A smaller-diameter washer 239 with smaller diameter than that of the larger-diameter washer 238 is disposed between each larger-diameter washer 238 and the flanged portion 115f or 116f (first or the second input plate member 111 or 112 or the carrier). An outer diameter of the larger-diameter washer 238 is determined in such a manner that the larger-diameter washer 238 opposes to the side face of the pinion gear 23B (gear body 230) and the side face of the inner teeth 25t of the ring gear 25B when each of the pinion gears 23B meshes with the inner teeth 25t. More specifically, an outer circumferential portion of the larger-diameter washer 238 protrudes radially outside the bottoms of inner teeth 25t of the ring gear 25B and opposes to a portion (inner circumferential portion) of the side face of the annular portion 250B located outside the bottoms of the inner teeth 25t. In this embodiment, an outer diameter of the smaller-diameter washer 239 is smaller than a deddendum circle of the gear teeth 23t of the pinion gear 23B and an outer circumference of the smaller-diameter washer 239 is located radially outside the needle bearings 231.

In the rotary inertia mass damper 20B with the configuration described above, the outer teeth 15t of the driven member 15 are located outside the first and the second springs SP1 and SP2 in the radial direction of the damper device. Accordingly, the centrifugal force applied to the first and the second springs SP1 and SP2 is reduced, thereby satisfactorily decreasing the hysteresis of the first and the second springs SP1 and SP2. Further, in the rotary inertia mass damper 20B, the axial motion of the ring gear 25B working as the mass body is restricted by the larger-diameter washers 238 disposed in the both sides of each pinion gear 23B in axial direction. This satisfactorily decreases the hysteresis of the rotary inertia mass damper 20B, that is, the torque difference ΔT, compared with supporting the ring gear 25B from both sides by the first and second input plate members 111 and 112. Accordingly, both the hysteresis in the torque transmission path including the first and the second springs SP1 and SP2 and the hysteresis in the rotary inertia mass damper 20B are satisfactorily decreased, thereby decreasing the actual vibration amplitude of the driven member 15 about the antiresonance points A1 and A2. Therefore, the vibration damping performance of the damper device including the rotary inertia mass damper 20B is effectively improved by making the frequency $fa_1$ of the antiresonance point A1 of the lower rotation speed side equal to (closer to) a frequency of one vibration (resonance) to be damped by the damper device in the above range and making the frequency $fa_2$ of the antiresonance point A2 of the higher rotation speed side equal to (closer to) a frequency of the other vibration (resonance) to be damped by the damper device. That is, the damper device including the rotary inertia mass damper 20B provides the similar operations and advantageous effects to those of the damper device 10 and the like described above.

Further, the larger-diameter washer 238 and the smaller diameter washer 239 are disposed between the each pinion gear 23B and the first or the second input plate member 111 or 112, so that the axial motion of the ring gear 25B may be restricted by the larger-diameter washer 238, while decreasing the hysteresis of the rotary inertia mass damper 20B by decreasing a relative speed between each pinion gear 23B and the larger-diameter washer 238. In the rotary inertia mass damper 20B, the side plates and the plurality of rivet are omitted from the ring gear 25B, thereby reducing the number of parts and enabling the damper device and the rotary inertia mass damper 20B to be more compact (in the axial direction) and lightweight. The larger-diameter washer 238 and the smaller-diameter washer 239 may be integrated with each other.

As has been described above, a damper device (10, 10X, 10Y, 10Z) according to one aspect of the disclosure is configured to include a plurality of rotational elements including an input element (11, 11Y, 11Z) to which a torque from an engine (EG) is transmitted and an output element (15, 15Y, 15Z), an elastic body (SP1, SP1', SP2, SP2', SP3) configured to transmit a torque between the input element (11, 11Y, 11Z) and the output element (15, 15Y, 15Z), and a rotary inertia mass damper (20, 20Y, 20Z) with a mass body (25) rotating in accordance with relative rotation between a first rotational element which is one of the plurality of rotational elements and a second rotational element different from the first rotational element. The rotary inertia mass damper (20, 20Y, 20Z) is configured to include a planetary gear (21) that includes a sun gear (15, 15t, 15Y, 15Z) arranged to rotate integrally with the first element, a carrier (11,111,112) that rotatably supports a plurality of pinion gears (23) and is arranged to rotate integrally with the second element, and a ring gear (25) that meshes with the plurality of pinion gears (23) and works as the mass body. Outer teeth (15t) of the sun gear are arranged to be disposed outside the elastic body (SP1, SP1', SP2, SP2', SP3) in a radial direction of the damper device (10, 10X, 10Y, 10Z). The sun gear (15, 15t, 15Y, 15Z), the plurality of pinion gears (23) and the ring gear (25) are arranged to at least partially overlap with the elastic body (SP1, SP1', SP2, SP2', SP3) in an axial direction of the damper device (10, 10X, 10Y, 10Z) as viewed in the radial direction. A motion of the ring gear (25) in the axial direction is restricted by the plurality of pinion gears (23).

In the damper device of this aspect, the torque transmitted to the output element via the elastic body depends on (is proportional to) the displacement of the elastic body transmitting the torque to the output element. The rotary inertia mass damper works in parallel to the elastic body disposed between the first rotational element and the second rotational element. The torque transmitted from the rotary inertia mass damper to the output element depends on (is proportional to) a difference in angular acceleration between the first rotational element and the second rotational element, i.e., a second order differential value of the displacement of the elastic body disposed between the first rotational element and the second rotational element. On the assumption that an input torque transmitted to the input element of the damper device is periodically vibrated, the phase of the vibration transmitted from the input element to the output element via the elastic body is accordingly shifted by 180 degrees from the phase of the vibration transmitted from the input element to the output element via the rotary inertia mass damper. That is, the damper device of this aspect enables an anti-resonance point where a vibration amplitude of the output element theoretically becomes equal to zero to be set therein.

Further, the outer teeth of the sun gear of the rotary inertia mass damper are arranged to be located outside the elastic body in the radial direction of the damper device, the elastic body transmitting the torque between the input element and the output element. By disposing the elastic body of the damper device radially inside the planetary gear of the rotary inertia mass damper, a centrifugal force applied to the elastic body can be reduced, thereby decreasing a hysteresis of the elastic body. Furthermore, in the damper device, the motion of the ring gear or the mass body of the rotary inertia mass damper in the axial direction is restricted by the plurality of pinion gears. This configuration enables a relative speed between the ring gear and the pinion gears that mesh with each other to be smaller than a relative speed between the ring gear and the carrier. Accordingly, a hysteresis of the rotary inertia mass damper is satisfactorily decreased, compared with restricting the motion of the ring gear in the axial direction by a member that works as the carrier of the planetary gear, for example.

As a result, the damper device satisfactorily decreases both the hysteresis of the elastic body and the hysteresis of the rotary inertia mass damper, thereby decreasing the vibration amplitude of the output element about the antiresonance point. Therefore, the vibration damping performance of the damper device is effectively improved by making a frequency of the antiresonance point equal to (closer to) a frequency of a vibration (resonance) to be damped by the damper device. The vibration damping performance of the rotary inertia mass damper is advantageously improved by decreasing the hysteresis of the rotary inertia mass damper. Further, in the damper device, the sun gear, the plurality of pinion gears and the ring gear are arranged to at least partially overlap with the elastic body in the axial direction of the damper device as viewed in the radial direction. This configuration further shortens the axial length of the damper device and further increases the moment of inertia of the ring gear or the mass body of the rotary inertia mass damper by disposing the ring gear while suppressing an increase of the weight of the ring gear, thereby enabling an inertia torque to be efficiently obtained.

The ring gear (25) of the planetary gear (21) may be configured to include a pair of supported portions (251) arranged to protrude inwardly in the radial direction to be respectively opposed to at least a side face of the pinion gear (23) at both sides of inner teeth (25t) of the ring gear (25) in the axial direction. This enables the axial motion of the ring gear to be restricted by the pinion gears at the engagement position between the ring gear and the pinion gear (the inner tooth and the gear tooth) where the relative speed between the ring gear and the pinion gear becomes substantially zero, thereby satisfactorily decreasing the hysteresis of the rotary inertia mass damper.

Inner circumferential surfaces of the supported portions (251) of the ring gear (25) may be arranged to be disposed inside tooth bottoms of the inner teeth (25t) in the radial direction and outside a pinion shaft (24) in the radial direction, the pinion shaft (24) supporting the pinion gear (23). This enables the axial motion of the ring gear to be restricted by the pinion gears.

The pinion gear (23) may be configured to include annular radially supporting portions (230s) that protrude both sides of gear teeth (23t) of the pinion gear (23) in the axial direction at an inner circumferential side of tooth bottoms of the gear teeth (23t) in the radial direction. The inner circumferential surfaces of the supported portions (251) of the ring gear (25) are supported in the radial direction by the radially supporting portions (230s) of the pinion gear (23). This enables the ring gear working as the mass body of the rotary inertia mass damper to be accurately aligned such as to smoothly rotate.

A damper device (10, 10X, 10Y, 10Z) according to another aspect of the disclosure is configured to include a plurality of rotational elements including an input element (11, 11Y, 11Z) to which a torque from an engine (EG) is transmitted and an output element (15, 15X, 15Y, 15Z), an elastic body (SP1, SP1', SP2, SP2', SP3) configured to transmit a torque between the input element (11, 11Y, 11Z) and the output element (15, 15X, 15Y, 15Z), and a rotary inertia mass damper (20B) with a mass body (25B) rotating in accordance with relative rotation between a first rotational element which is one of the plurality of rotational elements and a second rotational element different from the first rotational element. The rotary inertia mass damper (20B) is configured to include a planetary gear (21B) that includes a sun gear (15, 15t, 15X, 15Y, 15Z) arranged to rotate integrally with the first element, a carrier (11,111,112) that rotatably supports a plurality of pinion gears (23B) and is arranged to rotate integrally with the second element, and a ring gear (25B) that meshes with the plurality of pinion gears (23B) and works as the mass body. Outer teeth (15t) of the sun gear (15, 15t, 15X, 15Y, 15Z) are arranged to be disposed outside the elastic body (SP1, SP1', SP2, SP2', SP3) in a radial direction of the damper device (10, 10X, 10Y, 10Z). The sun gear (15, 15t, 15Y, 15X, 15Z), the plurality of pinion gears (23B) and the ring gear (25B) are arranged to at least partially overlap with the elastic body (SP1, SP1', SP2, SP2', SP3) in an axial direction of the damper device (10, 10X, 10Y, 10Z) as viewed in the radial direction. Washers (238, 239) are disposed both sides of each pinion gear (23B) in axial direction. A motion of the ring gear (25B) in the axial direction is restricted by the washers (238, 239).

The damper device of this aspect also enables an antiresonance point where a vibration amplitude of the output element theoretically becomes equal to zero to be set therein. Further, the outer teeth of the sun gear of the rotary inertia mass damper are arranged to be located outside the elastic body in the radial direction of the damper device, the elastic body transmitting a torque between the input element and the output element. Accordingly, a centrifugal force applied to the elastic body is reduced, thereby decreasing a hysteresis of the elastic body. Furthermore, in the damper device, the motion of the ring gear or the mass body of the rotary inertia mass damper in the axial direction is restricted by the washers disposed both sides of each pinion gear in axial direction. Accordingly, a hysteresis of the rotary inertia mass damper is satisfactorily decreased, compared with restricting the motion of the ring gear in the axial direction by a member that works as the carrier of the planetary gear, for example. As a result, the damper device satisfactorily decreases both the hysteresis of the elastic body and the hysteresis of the rotary inertia mass damper, thereby decreasing the vibration amplitude of the output element about the antiresonance point. Therefore, the vibration damping performance of the damper device including the rotary inertia mass damper is effectively improved by making a frequency of the antiresonance point equal to (closer to) a frequency of a vibration (resonance) to be damped by the damper device.

The washer may include a larger-diameter washer (238) disposed to be opposed to a side face of the pinion gear (23B) and side faces of inner teeth (25t) of the ring gear (25B), and a smaller-diameter washer (239) disposed between the larger-diameter washer (238) and the carrier (11,111,112). A diameter of the smaller-diameter washer (239) may be smaller than that of the larger-diameter washer (238). This enables the axial motion of the ring gear to be restricted by the larger-diameter washer, while decreasing the hysteresis of the rotary inertia mass damper by decreasing a relative speed between each pinion gear and the larger-diameter washer.

The plurality of rotational elements may include intermediate element (12, 12X, 12Y). The elastic body may include a first elastic body (SP1) configured to transmit a torque between the input element (11, 11Y) and the intermediate element (12, 12X, 12Y), and a second elastic body (SP2) configured to transmit a torque between the intermediate element (12, 12X, 12Y) and the output element (15, 15X, 15Y). The first rotational element may be one of the input element (11, 11Y) and the output element (15, 15X, 15Y). The second rotational element may be the other of the input element (11, 11Y) and the output element (15, 15X, 15Y). In the damper device, two resonances occur in a torque transmission path including the intermediate element, the first and the second elastic bodies when deflections of the first and the second elastic bodies are allowed. Accordingly, the damper device of this aspect enables two antiresonance points above described. Therefore, the vibration damping performance of the damper device is effectively improved by making frequencies of the two antiresonance points equal to (closer to) frequencies of vibrations (resonances) to be damped by the damper device. Further, by enabling the two antiresonance points to be set, the antiresonance point having the minimum frequency among the plurality of the antiresonance points may be shifted toward the lower frequency side and the vibration damping performance of the damper device may be improved in a wider rotation speed range.

The input element (11, 11Y) may be configured to include two input plate members (111, 112) arranged to be opposed to each other in the axial direction such as to rotatably support the plurality of pinion gears (23), the two input plate (111, 112) members working as the carrier. The output element (15, 15X, 15Y) is a single output plate member disposed between the two input plate members (111, 112) in the axial direction and configured to include the outer teeth (15t) in an outer circumference thereof to work as the sun gear. The intermediate element (12, 12X, 12Y) may be configured to include two intermediate plate members (121, 122) between which at least one of the input element (11, 11Y) and the output element (15, 15X, 15Y) is disposed. This configuration suppresses an increase of an axial length of the damper device accompanied with an installation of the rotary inertia mass damper and the intermediate member.

At least spring constants ($k_1$,$k_2$) of the first and the second elastic bodies (SP1, SP2) and moments of inertia ($J_2$, $J_i$) of the intermediate element (12, 12X, 12Y) and the ring gear (25) may be determined, based on a minimum frequency ($fa_1$) of frequencies of antiresonance points that provide zero vibration amplitude of the output element (15, 15X, 15Y).

Power from an internal combustion engine (EG) may be transmitted to the input element (11, 11Y). At least the spring constants ($k_1$,$k_2$) of the first and the second elastic bodies (SP1, SP2) and the moments of inertia ($J_2$, $J_i$) of the intermediate element (12, 12X, 12Y) and the ring gear (25) may be determined, based on the minimum frequency ($fa_1$) of the antiresonance point (A1) and number (n) of cylinders of the internal combustion engine (EG).

The damper device (10, 10X, 10Y) may be configured to satisfy 500 rpm≤(120/n)·fa$_1$≤1500 rpm, where "fa$_1$." denotes the minimum frequency of the antiresonance point and "n" denotes the number of cylinders of the internal combustion engine (EG).

Setting the antiresonance point that is likely to further decrease the vibration amplitude of the output element in the low rotation speed range of 500 rpm to 1500 rpm allows for coupling of the engine with the input element at the lower rotation speed and further improves the vibration damping effect of the damper device in a low rotation speed range where the vibration from the engine is likely to be increased. Configuration of the damper device such that a minimum frequency of a resonance occurring in the torque transmission path becomes a minimum possible value that is lower than the frequency fa$_1$ of the antiresonance point further reduces the frequency fa$_1$ of the antiresonance point and allows for coupling of the internal combustion engine with the input element at the further lower rotation speed.

The damper device (10, 10X, 10Y) may be configured to satisfy Nlup≤(120/n)·fa$_1$, where "Nlup" denotes a lockup rotation speed of a lockup clutch (8) arranged to couple the internal combustion engine (EG) with the input element (11, 11Y). This enables the vibration from the internal combustion engine to be remarkably effectively damped by the damper device when the internal combustion engine is coupled with the input element by the lockup clutch and immediately after engagement of the lockup.

The damper device (10, 10X, 10Y) may be configured to satisfy 900 rpm≤(120/n)·fa$_1$≤1200 rpm.

The minimum frequency fa$_1$ of the antiresonance point (A1) may be expressed by the above Equation (8). When an equation "γ=1/λ·(1+λ)" is satisfied in the Equation (8), the constant λ may be determined according to a connection configuration of rotational elements of the planetary gear with the input element, the intermediate element and the output element and a gear ratio of the planetary gear.

The first elastic body (SP1) may have a spring constant ($k_1$) that is identical with a spring constant ($k_2$) of the second elastic body (SP2).

The first elastic body (SP1) may have a spring constant ($k_1$) that is different from a spring constant ($k_2$) of the second elastic body (SP2). This increases the interval between the two antiresonance points, thus further improving the vibration damping effect of the damper device in the low frequency range (low rotation speed range).

The damper device (10, 10X, 10Y, 10Z) may be configured not to restrict deflections of the elastic body (SP1, SP1', SP2, SP2') until an input torque (T) transmitted to the input element (11, 11Y, 11Z) becomes equal to or larger than a predetermined threshold value (T1). The threshold value may be a torque value corresponding to a maximum torsion angle of the damper device and may be a smaller value than the value corresponding to the maximum torsion angle.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the damper device.

The invention claimed is:

1. A damper device configured to include a plurality of rotational elements including an input element to which a torque from an engine is transmitted and an output element, an elastic body configured to transmit a torque between the input element and the output element, and a rotary inertia mass damper with a mass body rotating in accordance with relative rotation between a first rotational element which is one of the plurality of rotational elements and a second rotational element different from the first rotational element, wherein the rotary inertia mass damper configured to include a planetary gear that includes a sun gear arranged to rotate integrally with the first element, a carrier that rotatably supports a plurality of pinion gears and is arranged to rotate integrally with the second element, and a ring gear that meshes with the plurality of pinion gears and works as the mass body, wherein outer teeth of the sun gear are arranged to be disposed outside the elastic body in a radial direction of the damper device, wherein the sun gear, the plurality of pinion gears and the ring gear are arranged to at least partially overlap with the elastic body in an axial direction of the damper device as viewed in the radial direction, and wherein a motion of the ring gear in the axial direction is restricted by the plurality of pinion gears.

2. The damper device according to claim 1, wherein the ring gear of the planetary gear configured to include a pair of supported portions arranged to protrude inwardly in the radial direction to be respectively opposed to at least a side face of a pinion gear of the plurality of pinion gears at both sides of inner teeth of the ring gear in the axial direction.

3. The damper device according to claim 2, wherein inner circumferential surfaces of the supported portions of the ring gear are arranged to be disposed inside tooth bottoms of the inner teeth in the radial direction and outside a pinion shaft in the radial direction, the pinion shaft supporting the pinion gear.

4. The damper device according to claim 2, wherein a pinion gear of the plurality of pinion gears is configured to include annular radially supporting portions that protrude both sides of gear teeth of the pinion gear in the axial direction at an inner circumferential side of tooth bottoms of the gear teeth in the radial direction, and wherein the inner circumferential surfaces of the supported portions of the ring gear are supported in the radial direction by the radially supporting portions of the pinion gear.

5. The damper device according to claim 1, wherein the plurality of rotational elements includes an intermediate element, wherein the elastic body includes a first elastic body configured to transmit a torque between the input element and the intermediate element, and a second elastic body configured to transmit a torque between the intermediate element and the output element, and wherein the first rotational element is one of the input element and the output element, and wherein the second rotational element is the other of the input element and the output element.

6. The damper device according to claim 5, wherein the input element configured to include two input plate members arranged to be opposed to each other in the axial direction such as to rotatably support the plurality of pinion gears, the two input plate members working as the carrier, wherein the output element is a single output plate member disposed between the two input plate members in the axial direction and configured to include the outer teeth in an outer circumference thereof to work as the sun gear, and wherein the intermediate element configured to include two intermediate plate members between which at least one of the input element and the output element is disposed in the axial direction.

7. The damper device according to claim 5, wherein at least spring constants of the first and the second elastic bodies and moments of inertia of the intermediate element and the ring gear are determined, based on a minimum frequency of frequencies of antiresonance points that provide zero vibration amplitude of the output element.

8. The damper device according to claim 7, wherein power from an internal combustion engine is transmitted to the input element, and wherein at least the spring constants of the first and the second elastic bodies and the moments of inertia of the intermediate element and the ring gear are determined, based on the minimum frequency of the antiresonance point and number of cylinders of the internal combustion engine.

9. The damper device according to claim 8, wherein the damper device is configured to satisfy 500 rpm≤(120/n)·$fa_1$≤1500 rpm, where "$fa_1$" denotes the minimum frequency of the antiresonance point and "n" denotes the number of cylinders of the internal combustion engine.

10. The damper device according to claim 9, wherein the damper device is configured to satisfy 900 rpm≤(120/n)·$fa_1$≤1200 rpm.

11. The damper device according claim 8, wherein the damper device is configured to satisfy Nlup≤ (120/n)·$fa_1$, where "Nlup" denotes a lockup rotation speed of a lockup clutch arranged to couple the internal combustion engine with the input element.

12. The damper device according to claim 7, wherein the minimum frequency $fa_1$ of the antiresonance point is expressed by the following equation:

$$fa_1 = \frac{1}{2\pi}\sqrt{\frac{(k_1+k_2) - \sqrt{(k_1+k_2)^2 - 4\cdot\frac{J_2}{J_i}\cdot\gamma\cdot k_1\cdot k_2}}{2\cdot J_2}}$$

where $k_1$ denotes the spring constant of the first elastic body, $k_2$ denotes the spring constant of the second elastic body, $J_2$ denotes the moment of inertia of the intermediate element, $J_i$ denotes the moment of inertia of the ring gear, and γ denotes a constant determined according to a connection configuration of rotational elements of the planetary gear with the input element and the output element, and a gear ratio of the planetary gear.

13. The damper device according to claim 5, wherein the first elastic body has a spring constant that is identical with a spring constant of the second elastic body.

14. The damper device according to claim 5, wherein the first elastic body has a spring constant that is different from a spring constant of the second elastic body.

15. The damper device according to claim 1, wherein the damper device is configured not to restrict deflections of the elastic body until an input torque transmitted to the input element becomes equal to or larger than a predetermined threshold value.

16. A damper device configured to include a plurality of rotational elements including an input element to which a torque from an engine is transmitted and an output element, an elastic body configured to transmit a torque between the input element and the output element, and a rotary inertia mass damper with a mass body rotating in accordance with relative rotation between a first rotational element which is one of the plurality of rotational elements and a second rotational element different from the first rotational element, wherein the rotary inertia mass damper configured to include a planetary gear that includes a sun gear arranged to rotate integrally with the first element, a carrier that rotatably supports a plurality of pinion gears and is arranged to rotate integrally with the second element, and a ring gear that engages with the plurality of pinion gears and works as the mass body, wherein outer teeth of the sun gear are arranged to be disposed outside the elastic body in a radial direction of the damper device, wherein the sun gear, the plurality of pinion gears and the ring gear are arranged to at least partially overlap with the elastic body in an axial direction of the damper device as viewed in the radial direction, wherein washers are disposed both sides of each pinion gear in axial direction, and wherein a motion of the ring gear in the axial direction is restricted by the washers.

17. The damper device according to claim 16, wherein the washer includes a larger-diameter washer disposed to be opposed to a side face of a pinion gear of the plurality of pinion gears and side faces of inner teeth of the ring gear, and a smaller-diameter washer disposed between the larger-diameter washer and the carrier, a diameter of the smaller-diameter washer being smaller than that of the larger-diameter washer.

18. The damper device according to claim 16, wherein the plurality of rotational elements includes an intermediate element, wherein the elastic body includes a first elastic body configured to transmit a torque between the input element and the intermediate element, and a second elastic body configured to transmit a torque between the intermediate element and the output element, and wherein the first rotational element is one of the input element and the output element, and wherein the second rotational element is the other of the input element and the output element.

19. The damper device according to claim 18, wherein the input element configured to include two input plate members arranged to be opposed to each other in the axial direction such as to rotatably support the plurality of pinion gears, the two input plate members working as the carrier, wherein the output element is a single output plate member disposed between the two input plate members in the axial direction and configured to include the outer teeth in an outer circumference thereof to work as the sun gear, and wherein the intermediate element configured to include two intermediate plate members between which at least one of the input element and the output element is disposed in the axial direction.

20. The damper device according to claim 18,
wherein at least spring constants of the first and the second elastic bodies and moments of inertia of the intermediate element and the ring gear are determined, based on a minimum frequency of frequencies of antiresonance points that provide zero vibration amplitude of the output element.

21. The damper device according to claim 20,
wherein power from an internal combustion engine is transmitted to the input element,
and wherein at least the spring constants of the first and the second elastic bodies and the moments of inertia of the intermediate element and the ring gear are determined, based on the minimum frequency of the antiresonance point and number of cylinders of the internal combustion engine.

22. The damper device according to claim 21,
wherein the damper device is configured to satisfy 500 rpm≤(120/n)·$fa_1$≤1500 rpm, where "$fa_1$" denotes the minimum frequency of the antiresonance point and "n" denotes the number of cylinders of the internal combustion engine.

23. The damper device according to claim 22,
wherein the damper device is configured to satisfy 900 rpm≤(120/n)·$fa_1$≤1200 rpm.

24. The damper device according to claim 21,
wherein the damper device is configured to satisfy Nlup≤(120/n)·$fa_1$, where "Nlup" denotes a lockup rotation speed of a lockup clutch arranged to couple the internal combustion engine with the input element.

25. The damper device according to claim 20,
wherein the minimum frequency $fa_1$ of the antiresonance point is expressed by the following equation:

$$fa_1 = \frac{1}{2\pi}\sqrt{\frac{(k_1+k_2) - \sqrt{(k_1+k_2)^2 - 4\cdot\frac{J_2}{J_i}\cdot\gamma\cdot k_1 \cdot k_2}}{2\cdot J_2}}$$

where $k_1$ denotes the spring constant of the first elastic body, $k_2$ denotes the spring constant of the second elastic body, $J_2$ denotes the moment of inertia of the intermediate element, $J_i$ denotes the moment of inertia of the ring gear, and $\gamma$ denotes a constant determined according to a connection configuration of rotational elements of the planetary gear with the input element and the output element, and a gear ratio of the planetary gear.

26. The damper device according to claim 18,
wherein the first elastic body has a spring constant that is identical with a spring constant of the second elastic body.

27. The damper device according to claim 18,
wherein the first elastic body has a spring constant that is different from a spring constant of the second elastic body.

28. The damper device according to claim 16,
wherein the damper device is configured not to restrict deflections of the elastic body until an input torque transmitted to the input element becomes equal to or larger than a predetermined threshold value.

* * * * *